United States Patent [19]

Hartzell et al.

[11] Patent Number: 5,294,229
[45] Date of Patent: Mar. 15, 1994

[54] TEACHER AND PARENT INTERACTIVE COMMUNICATION SYSTEM INCORPORATING POCKET SIZED PORTABLE AUDIO NUMERIC TERMINALS

[76] Inventors: Jonathan Hartzell, 8760-A Research Blvd. #210, Austin, Tex. 78758; Darrell R. Tunning, 4511-B Smooth Oak Dr., Austin, Tex. 78759

[21] Appl. No.: 826,475

[22] Filed: Jan. 27, 1992

[51] Int. Cl.$^5$ .................................. G09B 3/00
[52] U.S. Cl. ........................ 434/336; 434/322
[58] Field of Search ........................ 434/322–324, 434/336, 335, 321

[56] References Cited

U.S. PATENT DOCUMENTS

| | | | |
|---|---|---|---|
| 4,320,256 | 3/1982 | Freeman | 434/321 |
| 4,640,991 | 2/1987 | Matthews et al. | 379/88 |
| 4,799,254 | 1/1989 | Dayton et al. | 379/97 |
| 4,820,167 | 4/1989 | Nobles et al. | 434/336 |
| 4,877,408 | 10/1989 | Hartsfield | 434/336 |
| 5,002,491 | 3/1991 | Abrahamson et al. | 434/336 |

OTHER PUBLICATIONS

"Homework Hotline" by George E. Curry, Chicago Tribune.
"Homework Line" by William Massie, London, England, Sunday Express May 6, 1990.
"Homework Hotline" by Ann LoLordo, The Sun Maryland Jun. 24, 1990.

Primary Examiner—Stephen R. Crow
Assistant Examiner—Glenn E. Richman

[57] ABSTRACT

An electronic communication system and method of utilizing same for telephonically exchanging between teacher and parent information regarding student homework assignments, attendance, classroom behavior, and academic performance. During the school day each teacher carries a small, portable terminal (1) which not only accepts manually entered numeric data, but also produces digital audio recordings of voiced homework assignments, announcements, and comments made by the teacher. Upon leaving at the end of the day, the teacher returns the remote terminal to a centrally located storage rack (2). The system's central computer (3), electronically connected to the rack, then extracts data from the newly inserted terminal. The numeric and audio information thus gathered from a multiplicity of such terminals is organized by the computer and made telephonically available to participating parents.

6 Claims, 14 Drawing Sheets

TEACHER AND PARENT INTERACTIVE COMMUNICATION SYSTEM INCORPORATING POCKET SIZED PORTABLE AUDIO NUMERIC TERMINALS

BACKGROUND OF THE INVENTION

1. Field of Invention

This invention relates to an information recording, storage, retrieval and relay system, and particularly to an information recording, storage, retrieval and relay system for enhancing communication between teacher and parent, and among teaching faculty members themselves, regarding student performance, behavior and attendance in the educational environment.

2. Description of Prior Art

The majority of those who find themselves dealing in the modern affairs of business and the interactions of twentieth century society are well acquainted with what have come to be known facetiously as The Three Classic Lies, the first two of which are, "The check's in the mail," and, "I already gave at the office."

Unfortunately, in the realm of public education and parenting there has arisen another trio of standard deceptions that might best be depicted as follows: #1 "But, Mom, I don't have any homework tonight." #2 "But, Dad, I've got to watch this video of 'Wuthering Heights' because the dumb teacher didn't tell us about the book report until just yesterday, and they're out of it at the library." #3 "No sweat, Mom, I'm doing just fine in geometry. Look, I really need to get to the mall tonight, okay?"

Certainly there are variations on the above theme, a fact to which those skilled in the art of dealing with youth will readily attest. However, if the youthful creativity invested in devising such variation were instead directed toward actually completing assigned school work, parents, teachers and, most of all, students themselves, would benefit remarkably.

Despite tremendous technological progress that has taken place in the western world over the last two decades, various social and economic changes over the same period have produced certain negative impacts on the structure and function of educational systems, most notably in the United States.

With unanimous agreement educators now acknowledge that one of the most fundamental problems resides in the fact that the level of communication and interaction that once existed between teacher and parent has dropped to an unprecedented low. This decline can be attributed in large part to the fact that the number of families in which both father and mother are required to work outside the home has increased, while teachers find themselves carrying larger numbers of classes as well as additional custodial, bureaucratic and administrative duties extraneous to their primary teaching functions.

The phrase "teacher burnout" can appropriately be adapted to include "parent burnout" in describing this recent situation in which neither party seems to have the opportunity nor persistence required to establish the one-to-one communication that leads to effective collaboration. The victims of this growing distance between teacher and parent are the students themselves, who now emerge from high school with the lowest levels of competency and literacy ever recorded in our history of public education.

As there has been no practical method offered for effectively correcting or altering the structures and scheduling of our working society, any effort to rehabilitate collaboration between teacher and parent must now focus on advanced and innovative ways to re-establish communication between the two.

The first appearances of any organized or structured efforts to bring about teacher-parent communication certainly include the student report card, mailed at regular intervals, as well as parent-teacher conferences scheduled occasionally through the school year. Unfortunately, such meetings have been generally infrequent, and during the lengthy intervals between report card mailings there have been many instances in which a student's performance has declined considerably while the parent has remained unaware, awaiting the next report card.

With the intention of establishing a telephonic means for exchanging student-related information between teacher and parent one might at first be tempted to turn to several existing arrangements, such as those disclosed in U.S. Pat. Nos. 4,320,256; 4,640,991; 4,799,254; and 4,820,167. Though the inventions may accomplish their individual functions adequately, such systems, even if their most useful features are optimally combined to function as a telephone "homework hotline," can only fail to deliver the high performance that should ideally be required in today's educational environment.

Recent versions of such "homework hotlines" as described in the May 6th, 1990 London, England Sunday Express in a report by William Massie and in the Jun. 24th, 1990 Maryland Sun in a report by Ann Lo Lordo are, themselves, limited in function. Such telephone "hotlines" provide to the caller no more than pre-recorded announcements of homework assignments, lunch menus, and in some cases notifications regarding student attendance problems. Though that kind of information can certainly be important, unfortunately "homework hotlines" not only fail to deliver it efficiently and reliably as a result of inherent limitations, but also create several new problems in the process:

(a) A considerable amount of additional time and effort must be invested in such a "hotline" arrangement on the part of teachers and other school staff members to provide the voiced recordings of homework assignment announcements. In many cases to produce such recordings it is first necessary for each teacher to submit a homework assignment in written form to a designated staff member. The staff member must then sort and arrange all such written assignments received; enter by keypad for each assignment the specified code to identify the teacher and respective class period number; then read the assignment aloud into a voice recorder. This cycle of action must be repeated for every assignment submitted until all are finally recorded.

In other cases each teacher must locate an available telephone, place a call to gain access to the "hotline", enter tone digit codes to signify both teacher identification and the particular class period for which the assignment is intended, enter a recording command, then announce the assignment. This procedure must be repeated for each and every class period in which an assignment has been given. It is improtant to note that the making of such recordings requires redundant effort on the part of the teacher, given the fact that the homework assignments must also be announced in class, which in itself presents another problem:

(b) Because the recordings of homework assignments must be made separately and outside of the classroom, the "hotline" creates the possibility of inadvertant discrepancies occurring between the live classroom versions of such announcements and the recorded "hotline" versions.

(c) Such student-accessible "hotlines" have lulled many students into the assumption that, because they can call for their homework after school, they need not pay attention in class to their teachers as the assignments are given. Later in the evening those students who were inattentive now try to call the "hotline" to hear the assignments they should have noted earlier in class. Moreover, such unnecessary and excessive student use causes frustration among parent-users as they fail in their attempts to gain access to the "hotline" information.

Furthermore, such student reliance on "hotlines" gives rise to a new problem as evidenced by a report in the Chicago Tribune, written by columnist George E. Curry and ironically entitled "'No homework' excuse passe." In the report an English teacher reveals the new excuses now being given by students who rely on the "hotline" for their assignments: #1 "My phone is broken." #2 "I called and the line was busy." #3 "I called and I didn't get an answer." Thus it appears that such "hot lines," contrary to their purpose, have actually spawned yet another trio of lies as noted above, these being directed at the teachers instead of the parents.

Because of the inherent limitations of such "hotlines" several additional problems remain unaddressed:

(d) One major problem is of particular frustration to the teacher, who has no practical way of using such a "hotline" to communicate to a parent vital information concerning a specific student. The teacher, for example, cannot use the "hotline" to relay student-specific information regarding behavior in class, academic performance and personalized study suggestions. As a result the parent may remain unaware of a student problem that might otherwise be corrected in a timely manner.

(e) Another problem left unaddressed is found in the fact that "hotlines," because of inherent limitations, are incapable of determining whether incoming calls are being placed by parents or students, such inability resulting in false indications of parent participation. Furthermore, in the event in which a parent actually does call, such a "hotline," incapable of identifying the caller, cannot therefore document the inquiry and attribute it to that specific parent. As a result, the school staff can be placed in a vulnerable position in the event of a complaint alleging failure on the part of the school to provide information to that parent regarding assignments. Without documentation of that parent's "hotline" participation, or lack of same, the school has no reliable way of refuting such allegations.

The failure to identify telephone participants presents further problems when such "hotlines" are used in conjunction with common computerized automatic dialers intended to telephonically inform parents of their student's absence from school. Although such dialers in some cases have been an improvement over mailed absence reports in regard to speed, they nevertheless present several major problems in operation and reliability for both schools and parents:

Considerable time and effort is required, first by the teacher, who must produce a handwritten report identifying each absent student; second, by the student or courier assigned to personally carry the written report to the school administration office; third, by the staff member, who must compile the absence reports, then transcribe by keyboard in the format required by the automatic dialer the names of those students reported absent.

By matching the transcribed student names to home phone numbers on file the automatic dialer is then able to place the appropriate calls. Such calls are commonly placed during early morning or early evening with the assumption that those are the times when parents are most likely to be home; unfortunately the dialer frequently fails to reach those parents.

The majority of such failures can be attributed to the ease with which students, themselves, intercept the anticipated calls simply by picking up the phone, pretending to converse, then hanging up. By doing so the students thwart the intent of the automatic dialer, in essence "beating the system."

(f) Another problem yet unaddressed results from the inability of such "hotlines" to be student-specific. This in turn causes frustration for the parent who, after managing to gain access, must not only execute by way of tone digit signals several menu selections, but must also then listen to a number of pre-recorded homework assignments and other announcements, many of which do not pertain to the student in question.

Furthermore, such lack of student-specificity precludes the possibility of a parent being able to request, let alone obtain, vital and relevant information such as a particular student's current academic performance rating which, as earlier indicated, cannot even be entered into the "hotline" arrangement by the teacher in the first place.

Objects and Advantages

Accordingly, the overall thrust of this invention is not only to provide a system and method of communication for the specific purpose of relaying vital student-related information between teacher and parent, but also to address and correct each and every limitation and problem associated with the prior art as cited above. Therefore, several objects and advantages of the present invention are:

(a) to provide to teachers a rapid, highly convenient and efficient system for producing audio recordings of homework assignments, as well as for routing and relaying such information, thereby eliminating the numerous time-consuming steps heretofore required.

(b) to provide to teachers such a system requiring no further voiced input beyond that of simply announcing to the class in the customary manner the actual homework assignments.

(c) to provide to parents a dedicated communication system, telephonically accessible and free of unauthorized traffic, for the exchange of student-related information between teacher and parent and for thereby increasing direct student participation and responsibility in the classroom as a result of enhanced parental awareness and control;

(d) to provide to teachers a communication system and method for relaying to parents information and comments regarding not only homework assignments, but also the academic performance and classroom behavior of specific students. Such student specificity, heretofore unavailable in existing arrangements, allows parental access to information necessary to correct student problems in a timely manner.

(e) to provide to schools such a communication system that not only identifies participating callers by assigned access codes, but also logs all parental inquiries as well as the responses given by the system, thereby providing reliable and complete documentation for the benefit and protection of school staff. Such participant identification capability results in greater assurance that important comments and messages are in fact delivered to the intended parents, free of both unintended and malicious interception.

Additionally, the present invention is to provide such a communication system that automatically places telephone calls to a student's home in those cases in which the particular student has been reported absent from school. However, unlike previous automatic dialing arrangements, the present invention is to provide increased assurance that the absence report is indeed heard by the parent, rather than being intercepted by the student who waits in anticipation of such a telephone call. Moreover, the present invention is such as to eliminate most of the time-consuming procedures heretofore required by existing telephonic absence reporting arrangements.

(f) to provide such a communication system which, utilizing unique student-specific capability, presents to the parent-caller only that information relevant to his or her student. Such information is organized in a format resulting in a series of audio announcements beginning with the student's first name and continuing, class by class in consecutive class period order, with such information including: the class title; the teacher's name; comments made by the teacher regarding the performance or behavior of the student; the evening's homework assignment; any extended assignment pending whose due date extends beyond the following school day; the student's most recent academic performance rating.

(g) A further object is to provide such a communication system that goes a step beyond correcting the limitations and problems associated with existing "homework hotline" arrangements by additionally providing a convenient and efficient system for relaying messages and memoranda between and among teachers, themselves. This particular function is to enable the teacher to record a comment or message via his or her pocket-sized terminal, such that the recording will be heard at a chosen future time on the same terminal, or on any other designated terminal in the system. Such procedure in many instances circumvents and eliminates unnecessary reliance on standard telephonic systems for teacher-to-teacher message relay.

Still further objects and advantages will become apparent from a consideration of the ensuing description and drawings.

DESCRIPTION OF INVENTION

The detailed description of the present invention is organized according to the following outline:
A. System Overview
B. Remote Terminal Description
C. Remote Terminal Operation
 Daily Assignments
 Extended Assignments
 Comments
 Performance Ratings
 Absence Reports
 Memoranda
D. Terminal Storage Rack Description
E. Central Computer Description
F. Central Computer Operation

A. SYSTEM OVERVIEW

Figure 1:
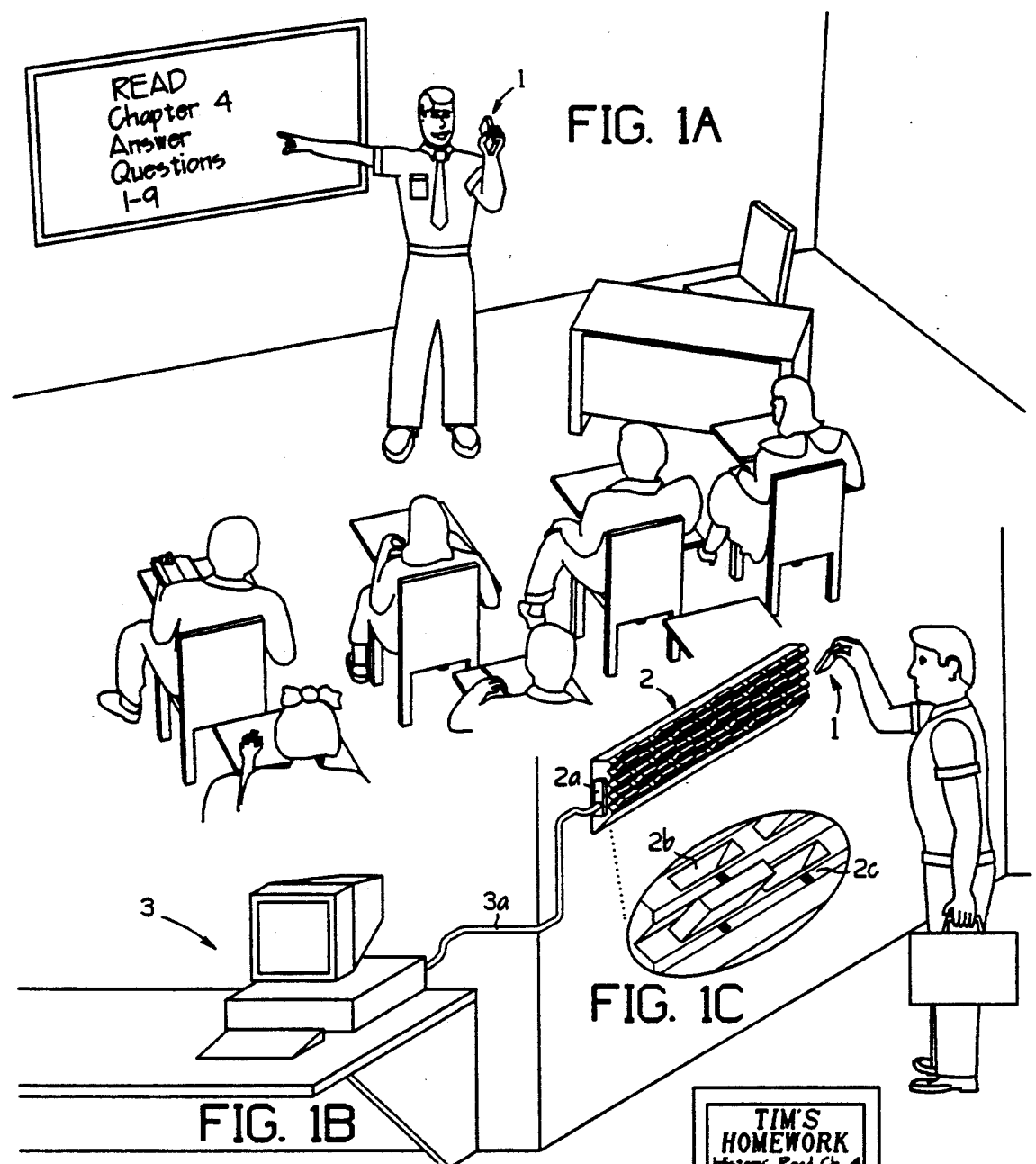
FIG. 1 presents a system overview, showing a teacher's use of a remote terminal in the classroom environment, the teacher replacing the remote terminal in a storage rack connected to a central computer, and a parent telephonically obtaining homework assignment information provided by the system.
Figure 2:
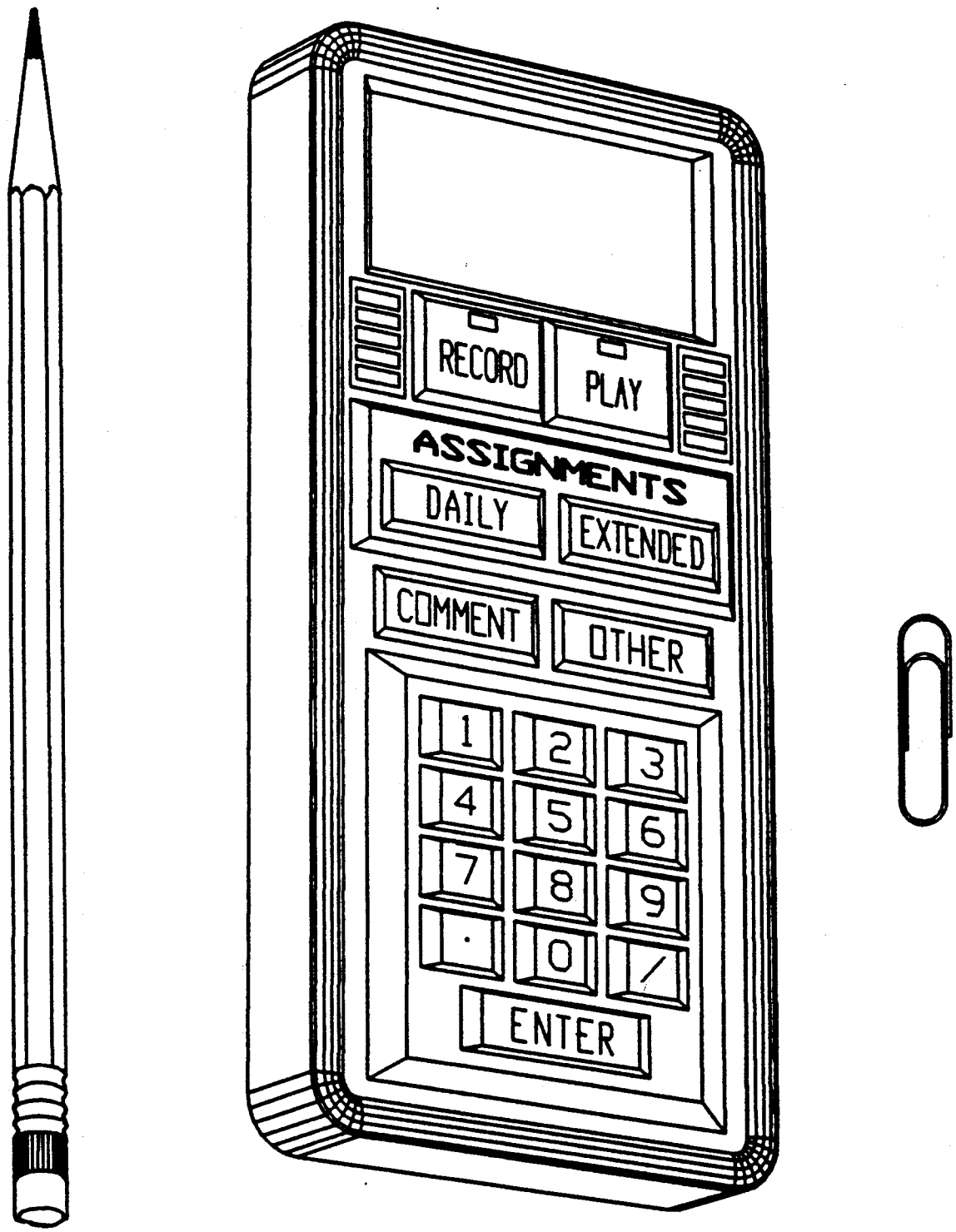
FIG. 2 presents a close-up perspective view of a remote terminal, shown in proximity to small common objects, namely a pencil and a paper clip, to convey the importance of its relatively small dimensions and compactness.

Referring to the drawings, and more particularly to the upper portion of FIG. 1 thereof, there is shown a teacher holding remote terminal 1 while announcing a homework assignment to the students in a classroom. A close-up view of the remote terminal is provided by FIG. 2. With reference again to FIG. 1 it can be seen that the remote terminal is being held in proximity to the teacher's mouth as the announcement is being made. This is to help illustrate that one of several important functions of the remote terminal is that of recording the teacher's voice during the actual announcement to the class of the evening's homework assignment.

Throughout the remainder of the school day the teacher will use the remote terminal not only to record additional assignments for other classes, but also to record comments and numeric information relating to the behavior and performance of specific students.

Upon leaving for home at the end of the school day the teacher will place the remote terminal into centrally located storage rack 2, as illustrated in the middle portion of FIG. 1. The rack is wired to central computer 3, which then extracts from the remote terminal all numeric and digitized audio data contained in the terminal memory. The computer then organizes and stores such data within its own memory, enabling it to not only correspond telephonically with parents who place calls to the system, as depicted at the bottom of FIG. 1, but also to originate outbound telephone calls for the purpose of relaying timely and important information to specific parents regarding their students.

B. REMOTE TERMINAL DESCRIPTION

Figure 3:
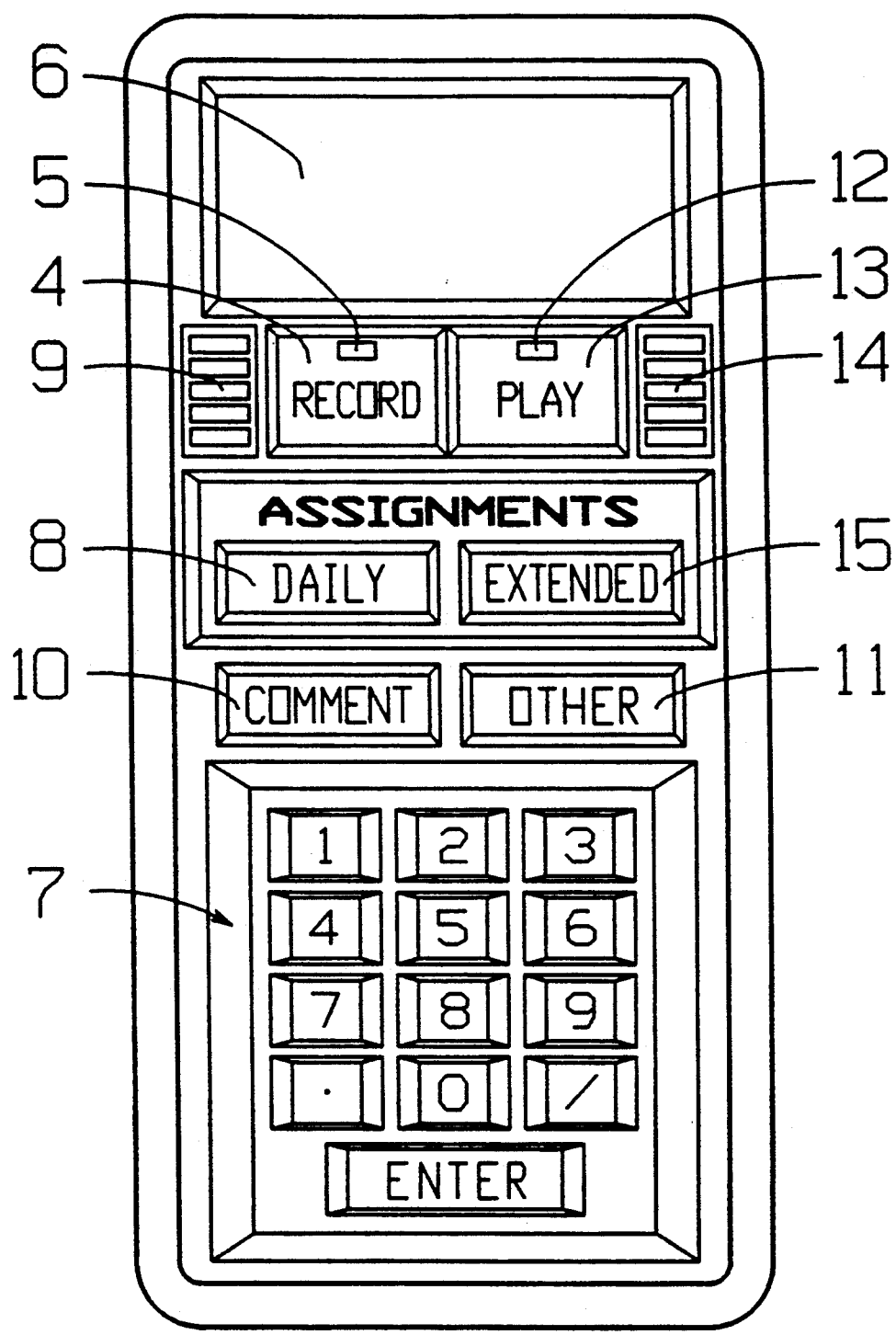
FIG. 3 shows a front view of the various features and controls on the face of a remote terminal.
Figure 4:
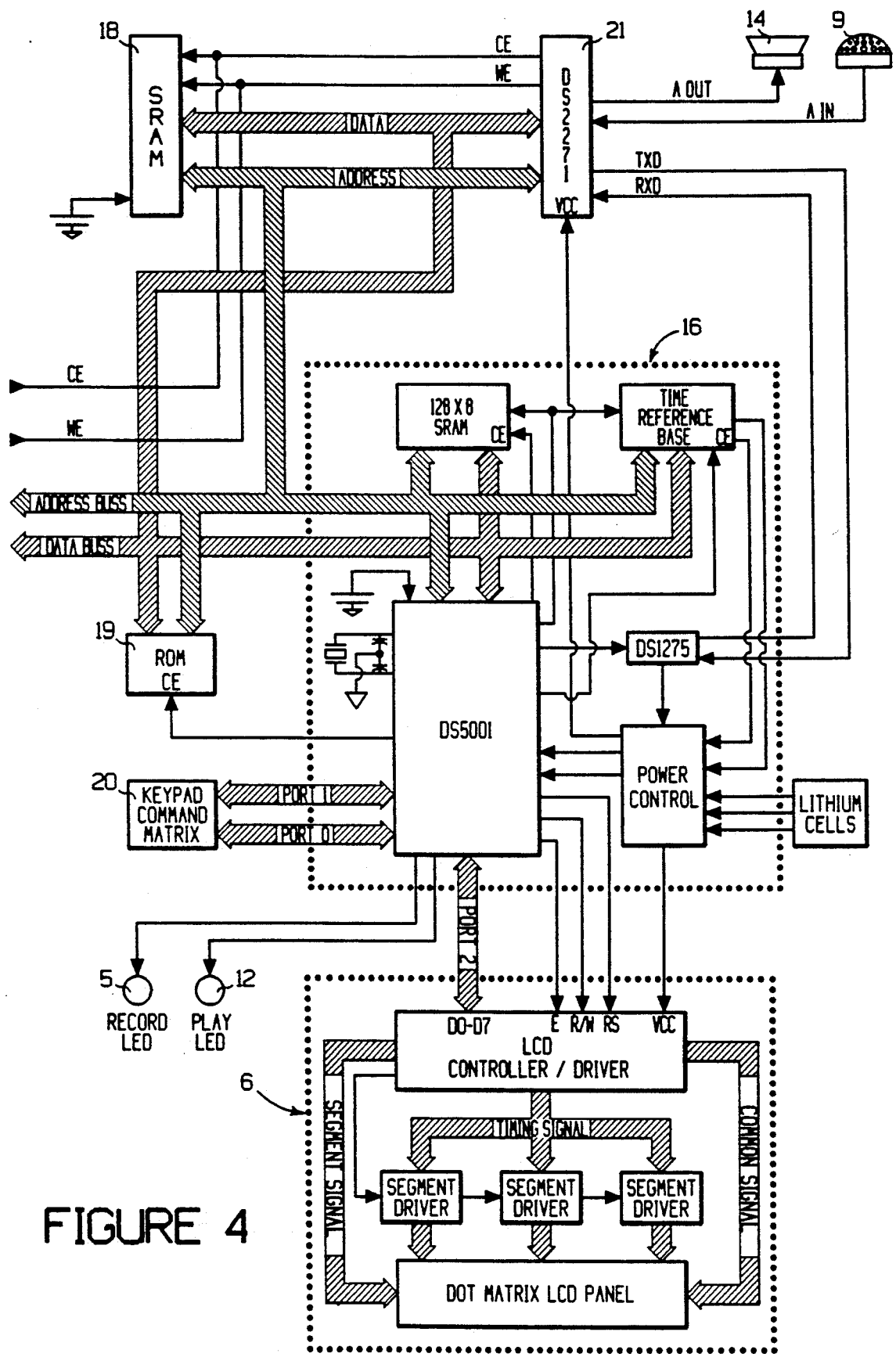
FIG. 4 is a block diagram of the operational circuits and components included in a remote terminal.

In the remote terminal block diagram featured in FIG. 4 keypad command matrix 20, providing for terminal manual data entry, comprises nineteen momentary contact keys which by way of common matrix encoding technique are in communication with controller 16. Included in the keypad matrix is a tone generator circuit for providing audio tone verification of all contact closures during manual keypad input. In the preferred embodiment the controller is a DS2256, providing overall control of remote terminal function. The DS2256, produced by Dallas Semiconductor, is a high performance 8-bit CMOS microcontroller. Its entire program/data memory space is implemented using high speed, non-volatile static CMOS RAM. Power source 17, a pair of five-volt lithium batteries, provides sufficient circuit operating voltage and power. The memory depicted comprises non-volatile SRAM 18 in addition to ROM 19, both in combination providing remote terminal data storage. Visual display 6 (FIGS. 3 and 4) is a common 5×7 dot matrix LCD displaying three lines of twenty-character length and provides visual prompts for the user as well as verification of terminal operation in progress. It is anticipated that future embodiments of the invention may include advanced variations of display devices serving similar function. Microphone 9 (FIGS. 3 and 4) is a miniature electret connected to the buffered analog input of digital audio recorder/reproducer 21, which in the preferred embodiment is a DS2271 produced by Dallas Semiconductor and whose buffered analog output is in turn connected to miniature speaker 14 (FIGS. 3 and 4). The DS2271, microphone 9 and speaker 14 serve in combination as the terminal audio recorder/reproducer with direct memory access.

The DS2271 employed in the preferred embodiment is a solid state integrated digital audio recorder/reproducer containing all necessary circuitry to convert analog audio signals to digital form. It also stores in and retrieves from memory discrete user-selectable digital sound representations and in turn performs the digital to analog conversions required in reproducing the original analog audio signals. It should be noted that other more advanced versions of solid state recording-reproducing circuits can be employed in the present invention as they become available.

C. REMOTE TERMINAL OPERATION DAILY ASSIGNMENTS

To establish a clear understanding of the various capabilities and operation of the remote terminal it will be best to begin by addressing one of its most important functions, which is that of recording homework assignments. Forthcoming references will be made to FIGS. 3, 4 and 5.

For the purpose of illustration it will be assumed that a school teacher, whose name for later reference will be Jane Doe, is about to announce a daily homework assignment to the students in her Period 2 Freshman English class. The teacher removes her remote terminal from her desk or purse, the terminal containing in the ROM component of its memory a unique terminal identification number. Holding her remote terminal in hand, she then stands before the class and presses "RECORD" button 4 (FIG. 3) until she hears a "beep" tone, produced by the keypad matrix tone generator, verifying that the terminal power is now switched on. In this case, and in all cases in which the terminal is energized by way of the "RECORD" button, controller 16 (FIG. 4) then directs a timed intermittent voltage to red LED 5 (FIGS. 3 and 4), causing it to blink, thereby indicating that the terminal is now activated and in the "record-ready" mode. The controller also fetches from ROM component 19 (FIG. 4) a text string which it then presents by way of terminal visual display 6. In reference to the flow chart of FIG. 5, entitled "Recording Assignments," it will be seen that immediately after the "RECORD" button has been pressed 22, one of two alternating text strings 23 presented on the visual display prompts the teacher to designate the particular class period number corresponding to the assignment to be announced. Thus prompted, the teacher then presses 24 the numeral 2 key found on terminal keypad 7 (FIG. 3). In response the controller fetches from ROM and directs to the visual display text string prompt 25 (FIG. 5) that not only verifies the period number as entered, but also further instructs the teacher to select 26 the desired terminal function.

Figure 5:
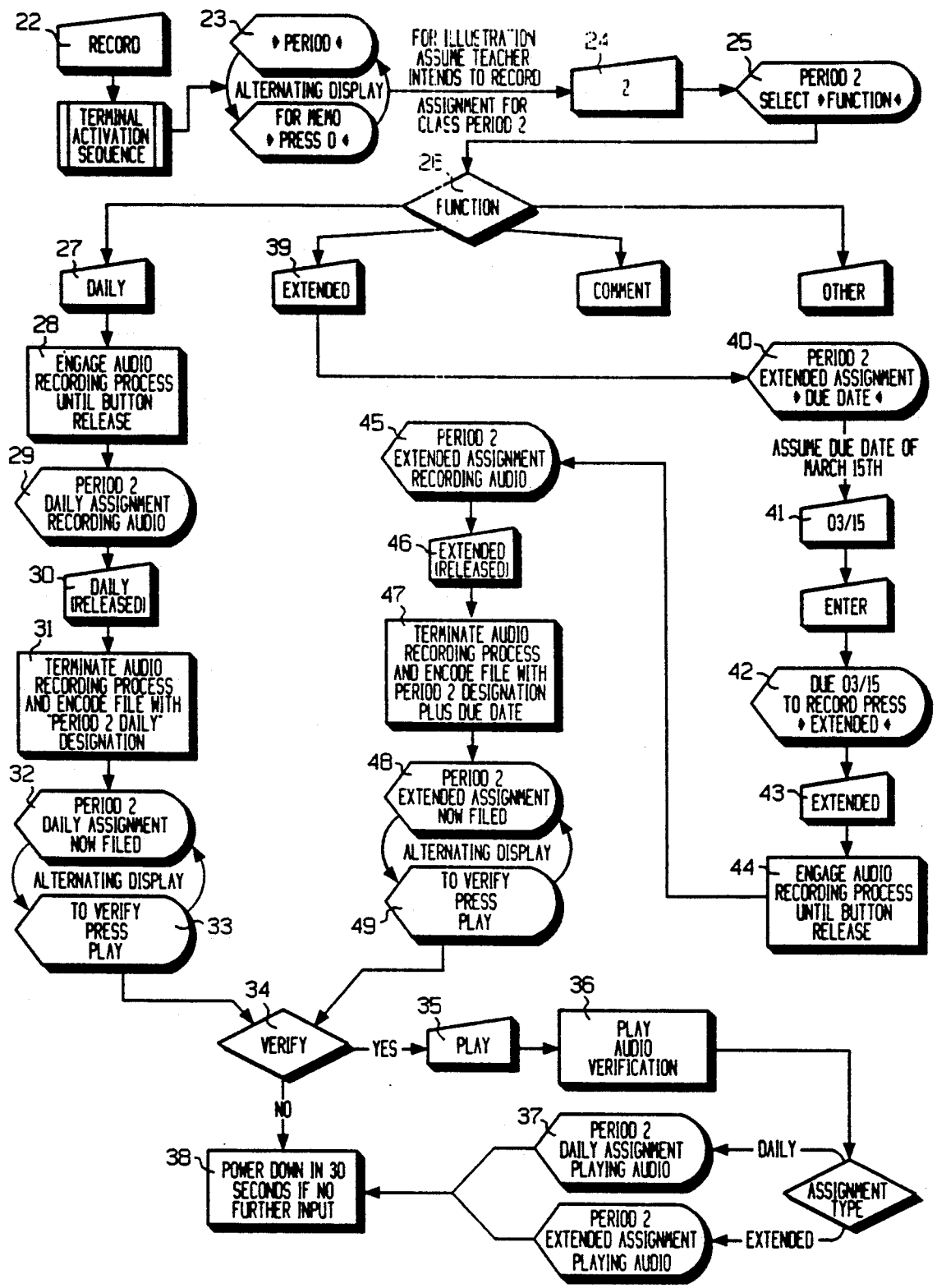
FIG. 5 is a flow chart illustrating a sequence of actions and operations involved in the use of a remote terminal for the purpose of recording student homework assignments.

The teacher then presses 27 "DAILY" button 8 (FIG. 3), which serves to select and activate the terminal's daily assignment function. Holding the terminal close to the mouth, the teacher announces to the class the daily homework assignment, "For tomorrow, finish chapter three and answer all eight of the review questions." With reference to FIG. 5 it can be seen that such action causes the controller to issue 28 a "record" command to digital audio recorder/reproducer 21 (FIG. 4), as well as to cause the visual display to present textual verification of the fact that the audio recording of a daily assignment for Period 2 is in progress 29 (FIG. 5). As with all further cases in which remote terminal recording is in progress, the controller furthermore directs a continuous voltage to the red LED, causing it to glow steadily, thereby providing additional confirmation that such recording is taking place.

Upon completion of the announcement of the daily homework assignment the teacher releases 30 the "DAILY" button, causing the controller to issue a "stop" command to the digital audio recorder/reproducer and to encode the resulting data string as "Period 2 Daily Assignment" 31, routing such data to the RAM component of memory and causing the visual display to present two alternating text strings, the first text string indicating that the daily assignment for Period 2 is now filed 32, and the second string presenting to the teacher the option of playing the resulting recording for verification 33. As with all further remote terminal operations, upon cessation of the recording process the controller also causes the red LED to resume blinking, thereby indicating that the terminal is restored to the "record-ready" mode. If a mistake should happen to have occurred during the announcement, such that the teacher would immediately desire to revise the resulting recording, she can simply press the "DAILY" button once again, causing the controller to issue a "re-record" command and enabling her to re-voice the announcement. In the event the teacher chooses to review the recording for verification 34 she then presses "PLAY" button 13 (FIG. 3). It should be noted that "PLAY" button 13 and "RECORD" button 4 serve to select between the two operating modes of the remote terminal, one mode being that of recording, the other of reproducing. In reference to FIG. 5 it will be seen that engagement 35 of the "PLAY" button at this and other times when terminal power is already on signals the controller to command 36 the digital audio recorder/reproducer play the most recent recording. At such time the controller also de-activates the blinking red LED as it simultaneously directs voltage to green LED 12 (FIGS. 3 and 4), causing it to glow steadily to signify that the remote terminal is in the "play" mode. Furthermore the controller sends a subsequent text string to the visual display, indicating that the audio recording of the daily assignment for Period 2 is being played 37 (FIG. 5).

As with all other remote terminal operations, upon completion of any function the controller turns off operating power after thirty seconds, if no further input or use occurs 38.

EXTENDED ASSIGNMENTS

The above description of remote terminal operation and procedure involving daily assignments can now be expanded to include the management of extended assignments. An extended assignment is understood to be one which has a due date extending beyond the following school day, such as a book report or term paper.

For the purpose of illustration it will be assumed that the date is March 4th, and the teacher, Jane Doe, now wishes to announce to the same Period 2 class an extended homework assignment. Again, taking her remote terminal in hand, she presses the "RECORD" button, such action depicted by block 22 (FIG. 5).

By established procedure she again designates Period 2 and, when prompted to select the terminal function, she presses "EXTENDED" button 15 (FIG. 3), which serves to select the terminal's extended assignment function. Such momentary engagement 39 (FIG. 5) of the "EXTENDED" button causes the controller to fetch from ROM and direct to the visual display text string 40 that prompts the teacher to designate the extended assignment due date. Assuming the teacher requires the assignment to be completed and submitted by March 15th, she then enters that date 41 by way of the terminal keypad. Such entry causes the controller to present subsequent visual prompt 42, verifying the due date as entered, and further instructing the teacher to again press the "EXTENDED" button for the purpose of activating the audio recording process. While pressing and holding down 43 the "EXTENDED" button, the teacher announces the assignment in the presence of the class, "On Thursday, March 15th, your Robert Frost essay is due." Upon such secondary engagement of the "EXTENDED" button the controller issues "record" command 44 to the audio recorder/reproducer and simultaneously presents visual verification of the fact that the audio recording of an extended assignment for Period 2 is in progress 45. Upon completion of her announcement the teacher releases 46 the "EXTENDED" button, causing the controller to terminate the recording process, to encode the resulting digital audio data string with a Period 2 designation including specified due date 47, and to cause alternating text to be displayed confirming 48 the filing of the extended assignment and providing the option of playback verification 49, the procedure for which has been previously established.

COMMENTS

In addition to its function of recording and filing announcements regarding homework assignments, the remote terminal is also capable of recording important comments made by the teacher and directed to parents and faculty regarding student behavior and performance. To illustrate this capability it will be assumed that a teacher, whose name for future reference will be John Smith, intends to direct a comment to the parents of Tim Jones regarding the classroom behavior of their son in Period 1 Algebra.

Figure 6:
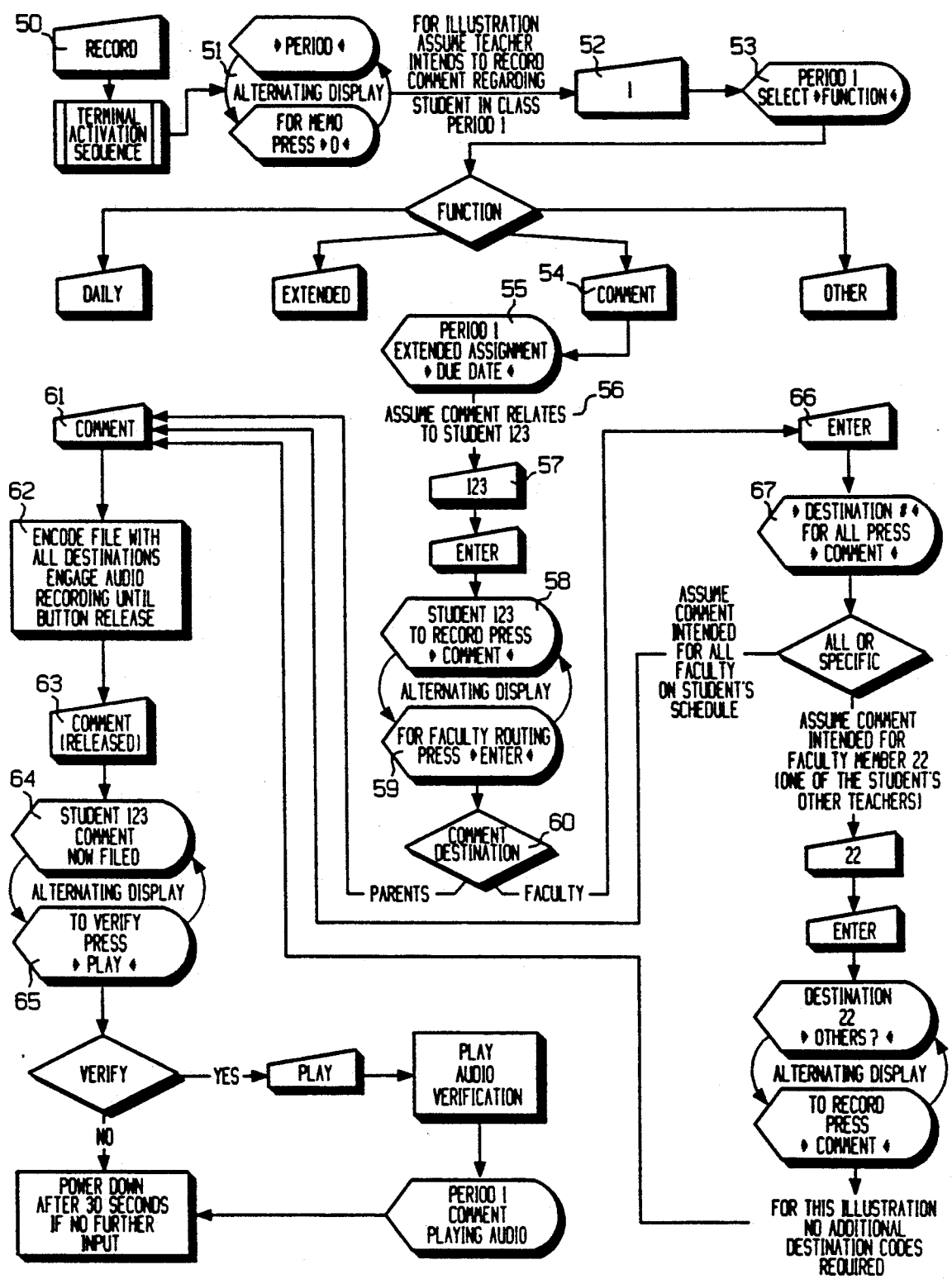
FIG. 6 is a flow chart illustrating a sequence of actions and operations involved in the use of a remote terminal for the purpose of recording teacher comments regarding specific students.

Taking the remote terminal in hand, the teacher presses 50 (FIG. 6) the "RECORD" button, and when prompted 51, enters 52 the desired period number, which in this case is 1. Responding to selection prompt 53, he then presses 54 "COMMENT" button 10 (FIG. 3), resulting in visual prompt 55 (FIG. 6) requesting the teacher to designate the identification number of the student to whom the intended comment pertains. It should be noted that the "COMMENT" button serves to select the terminal's comment function. For the purpose of this illustration it will be assumed that the student, Tim Jones, has been assigned 56 the unique student I.D. number of 123. Such designation 57 then causes the appearance of subsequent alternating prompts to advise the teacher of two comment destination options: Option one 58 routes the comment so that it is made available for telephonic presentation to the particular student's parent; option two 59 provides for faculty routing within the school itself, such that the comment is distributed exclusively to the remote terminals of selected school faculty members.

Because in this illustration the teacher intends the parent to be the recipient of the comment to be recorded, he now chooses 60 to press 61 the "COMMENT" button, causing the controller to encode the ensuing comment with the selected destination while engaging 62 the audio recording process. The teacher then voices the comment, "Tim was unusually inattentive in class today, and failed to turn in yesterday's homework. I thought I'd let you know right away, before things got out of hand. Thanks, folks!"

Having completed the comment, the teacher then releases 63 the "COMMENT" button, causing termination of the recording process and resulting in visual display verification of the fact that the comment has been filed 64 as well as presentation of the option of audio playback 65.

For an alternate illustration of the remote terminal "comment" function, it will be assumed that the teacher, rather than directing the above comment to the parent, instead decides 60 to route a comment to other faculty members after having confronted the student about his lack of class participation. So intending, the teacher then presses 66 the "ENTER" key, causing the appearance of visual prompt 67 presenting the option of either selecting specific faculty members or directing the comment to all faculty on the student's class schedule. Further deciding to address the comment to all of Tim's other instructors, the teacher then presses 61 the "COMMENT" button and voices the comment, "If you've noticed that Tim hasn't been able to concentrate in class in the last couple days, it turns out his grandfather died rather suddenly the other night. His dad says Tim's taking it pretty hard. This might not be a good time to make comments to his parents about any behavior problems or late homework. He'll probably be back up to speed in a couple days."

After voicing the comment the teacher releases 63 the "COMMENT" button, causing the resulting audio recording to be filed in similar manner as described above.

PERFORMANCE RATINGS

Another important function performed by the remote terminal is that of recording student performance ratings. Such ratings are expressed in percentage terms, as is commonly practiced in the school environment. To illustrate the performance rating operation it will be assumed that a teacher, having evaluated the scores on a test, intends to record the most recent academic ratings for a fourth period class.

Figure 7:
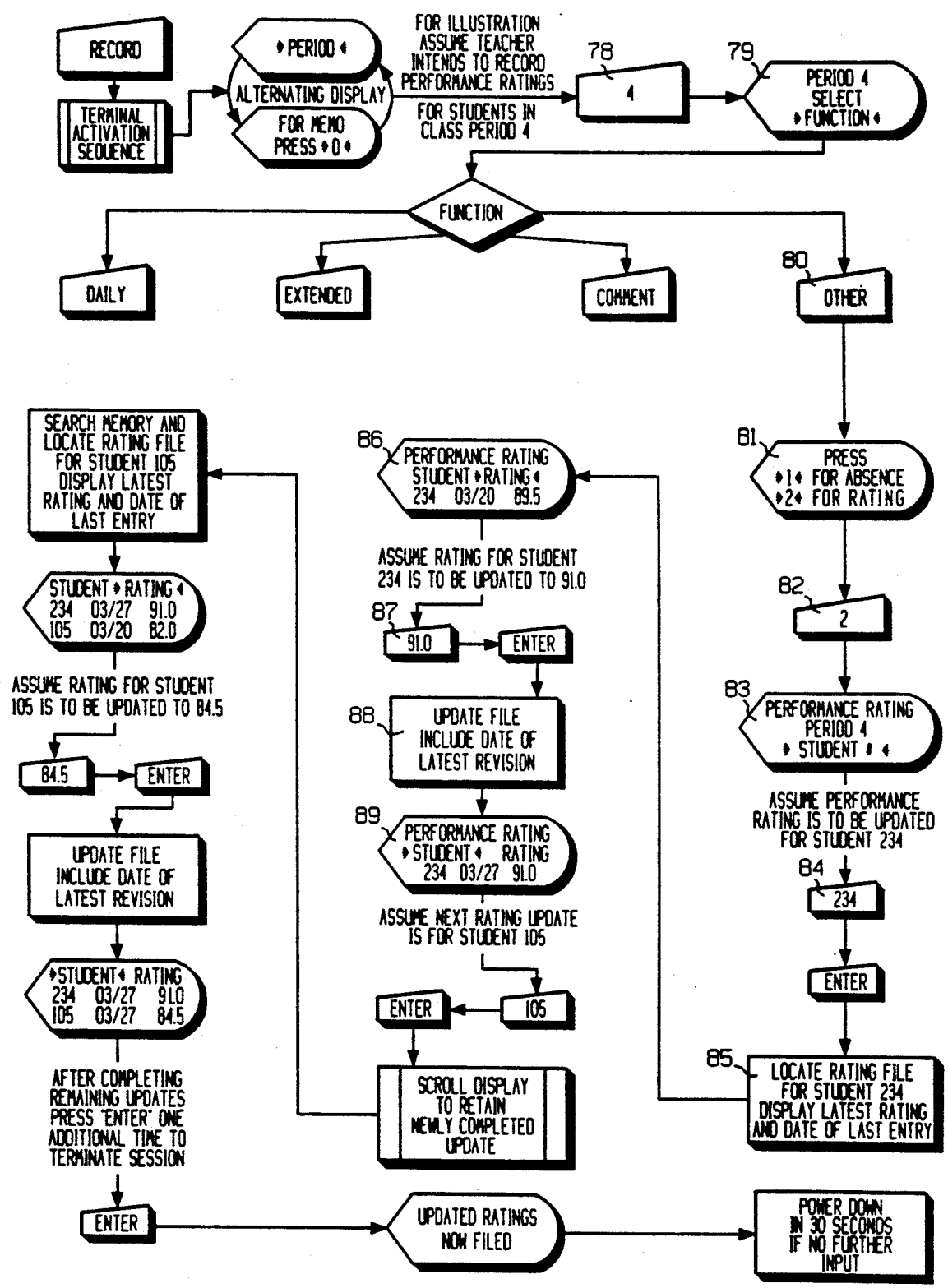
FIG. 7 is a flow chart illustrating a sequence of actions and operations involved in the use of a remote terminal for the purpose of recording student performance ratings.

Using established procedure, the teacher activates the remote terminal, designates 78 (FIG. 7) the appropriate class period number, then, when prompted 79, presses 80 "OTHER" button 11 (FIG. 3), which in combination with the numeral "2" key, serves to select the terminal's performance rating function. Specifically, engagement of the "OTHER" button causes the appearance of text string 81 (FIG. 7) on the visual display, instructing the teacher to press the numeral "2" key to select the terminal's performance rating function. Such action 82 results in the presentation of visual prompt 83 instructing the teacher to indicate a student I.D. number, which for this illustration will be 234. The teacher then enters 84 the student I.D. number, causing the controller to retrieve 85 from memory the most recently recorded performance rating for that particular student, as well as the date of such entry, and to display such information for verification 86. The teacher, wishing to update the student's rating from the illustrated 89.5 to 91.0, simply enters 87 the new figure of 91.0, causing the controller to update the file for student 234 accordingly, to append 88 the current date of the revision, and to display verification of the filing of such information 89. The teacher now proceeds to revise in similar manner the performance ratings of as many other students as necessary, as depicted in the remainder of the flow chart of FIG. 7.

ABSENCE REPORTS

Figure 8:
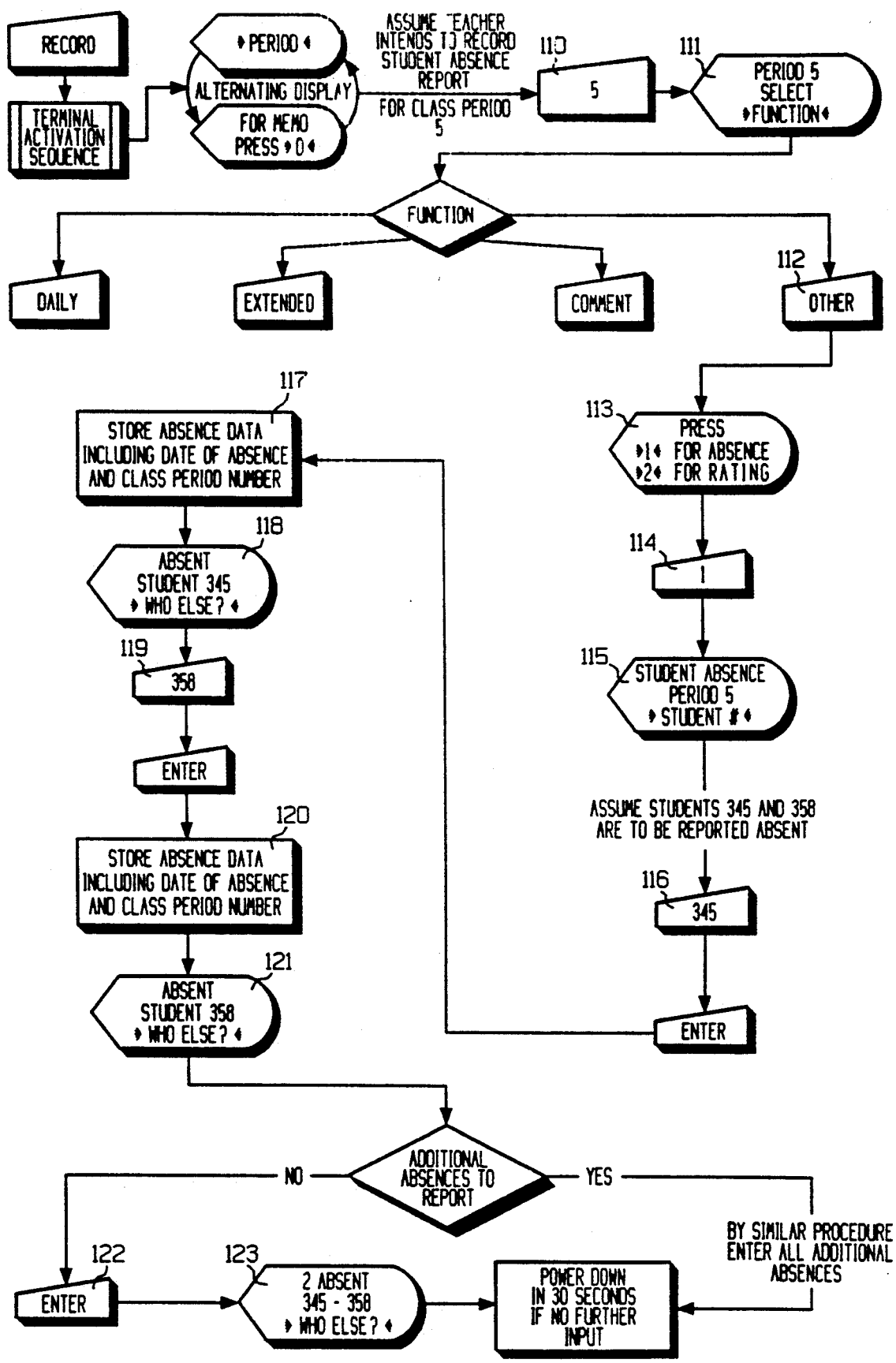
FIG. 8 is a flow chart illustrating a sequence of actions and operations involved in the use of a remote terminal for the purpose of recording student absences from class.

The recording of student absences from class is yet another useful function of the remote terminal. To illustrate the operation of absence reporting it will be assumed that a teacher intends to report the absence from period 5 of two students identified as 123 and 358. Having activated the remote terminal by previously established procedure, the teacher first designates 110 (FIG. 8) the appropriate period number, such action resulting in visual prompt 111 instructing the teacher as usual to select the desired function. The teacher then presses 112 the "OTHER" button, which, in combination with the numeral "1" key, serves to select the terminal's absence report function. Specifically, engagement of the "OTHER" button causes the appearance of text string 113 on the visual display, instructing the teacher to press the numeral "1" key to select the terminal's absence reporting function. Such action 114 results in the presentation of visual prompt 115 requesting the I.D. number of the first student to be reported absent. The teacher then enters 116 the I.D. number of the first student, causing the controller to store 117 the absence data along with the date and class period number of the absence. Upon such filing the controller also causes visual verification to appear, indicating the I.D. number of the absent student, as well as a prompt instructing the teacher to enter the I.D. number of any other student to be reported 118. In response the teacher enters 119 the number of the second student to be reported, causing the controller to record and store in memory that absence report as well 120, while also providing visual verification 121 of the last entry made. Having reported all absences, the teacher now simply presses 122 the "ENTER" key located on the keypad. Such action causes the controller to present 123 a visual summary of the total number of students absent, as well as a listing of each student's I.D. number.

MEMORANDA

To provide further convenience for the school's teaching staff an additional feature has been incorporated in the present invention for enabling teachers to communicate among themselves with greater ease and efficiency. To illustrate the memorandum function of the remote terminal it will be assumed that a teacher intends to record a memorandum to remind himself to attend an important school board meeting in two weeks on April 12th, such that the memorandum will be played back on his own remote terminal on that date.

Figure 9:
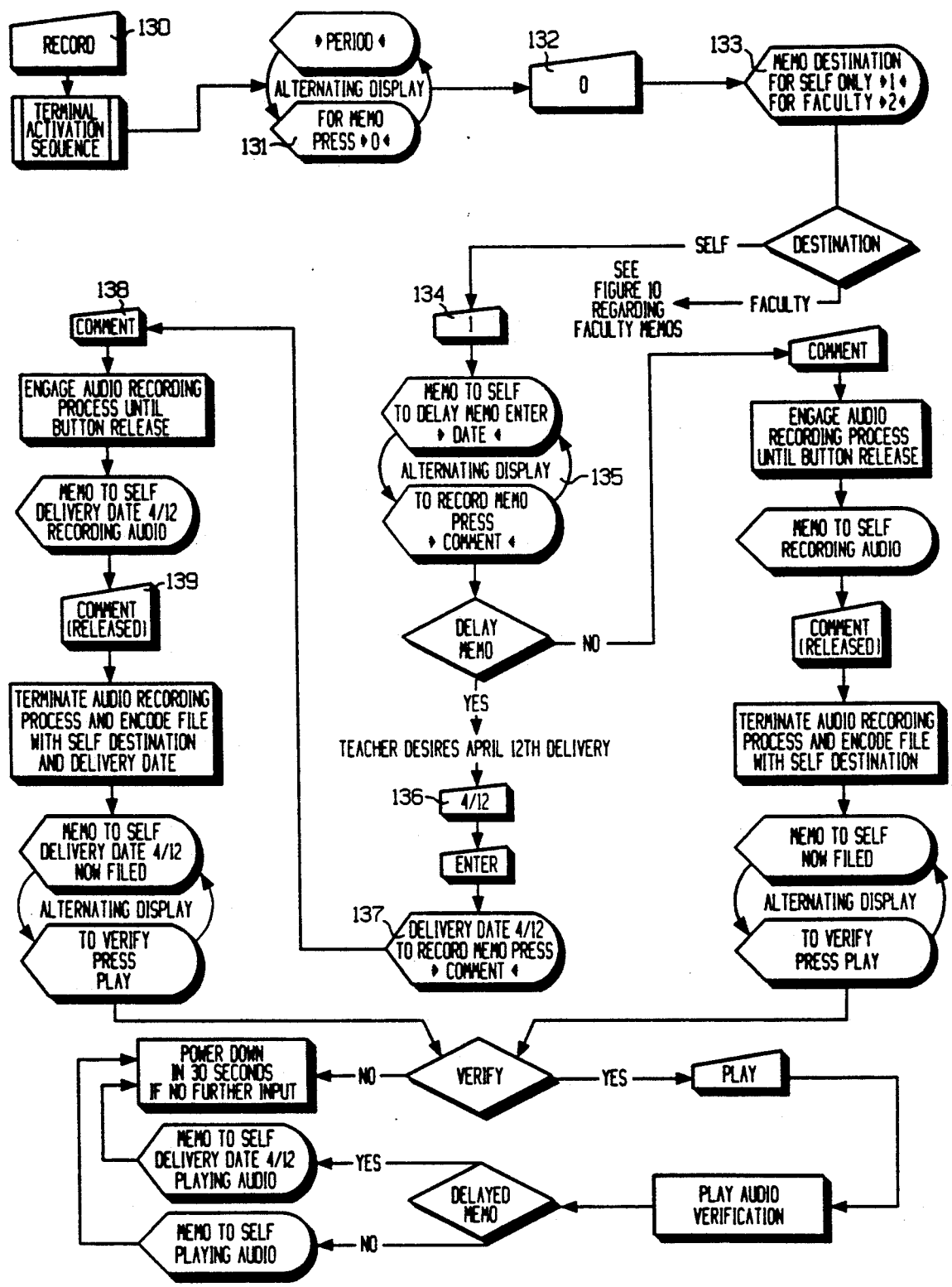
FIG. 9 is a flow chart illustrating a sequence of actions and operations involved in the use of a remote terminal for the purpose of recording memoranda intended for playback on the originating remote terminal.

The teacher activates the terminal in the usual manner by pressing 130 (FIG. 9) the "RECORD" button, causing the appearance of alternating visual prompt 131 instructing the teacher to either indicate a class period number or to enter the numeral "0" by way of the keypad. It should be noted that the "0" key, when engaged directly following the pressing of the "RECORD" button, serves to select the terminal's memorandum function. The teacher, wishing to record a memorandum, therefore presses 132 the "0" key, causing the appearance of subsequent visual prompt 133 presenting two destination options for the proposed memorandum. The first option, designated by the numeral "1" key, routes the memorandum so that it will later be presented on the very same terminal on which it was recorded. The second option, designated by the numeral "2" key, routes the memorandum so that it will later be presented on other specified remote terminals. As the teacher intends the memorandum to serve as a self-reminder, he designates such by pressing 134 the numeral "1" key, causing the appearance of subsequent visual prompt 135 confirming the memorandum destination and providing opportunity for the teacher to indicate a delayed date for memorandum delivery beyond the following school day. Without a specified delivery date the memorandum would be delivered on the very next school day; however, because in this illustration the teacher desires an April 12th delivery, he therefore enters that date 136. Upon such entry a visual verification of the delivery date appears in addition to prompt 137 instructing the teacher to press the "COMMENT"

button for the purpose of voicing and recording the memorandum.

In response to the prompt the teacher presses 138 the "COMMENT" button and voices the memorandum, and in accordance with established procedure releases 139 the button when finished speaking. As with most other remote terminal recording operations, playback verification is immediately available.

Figure 10:
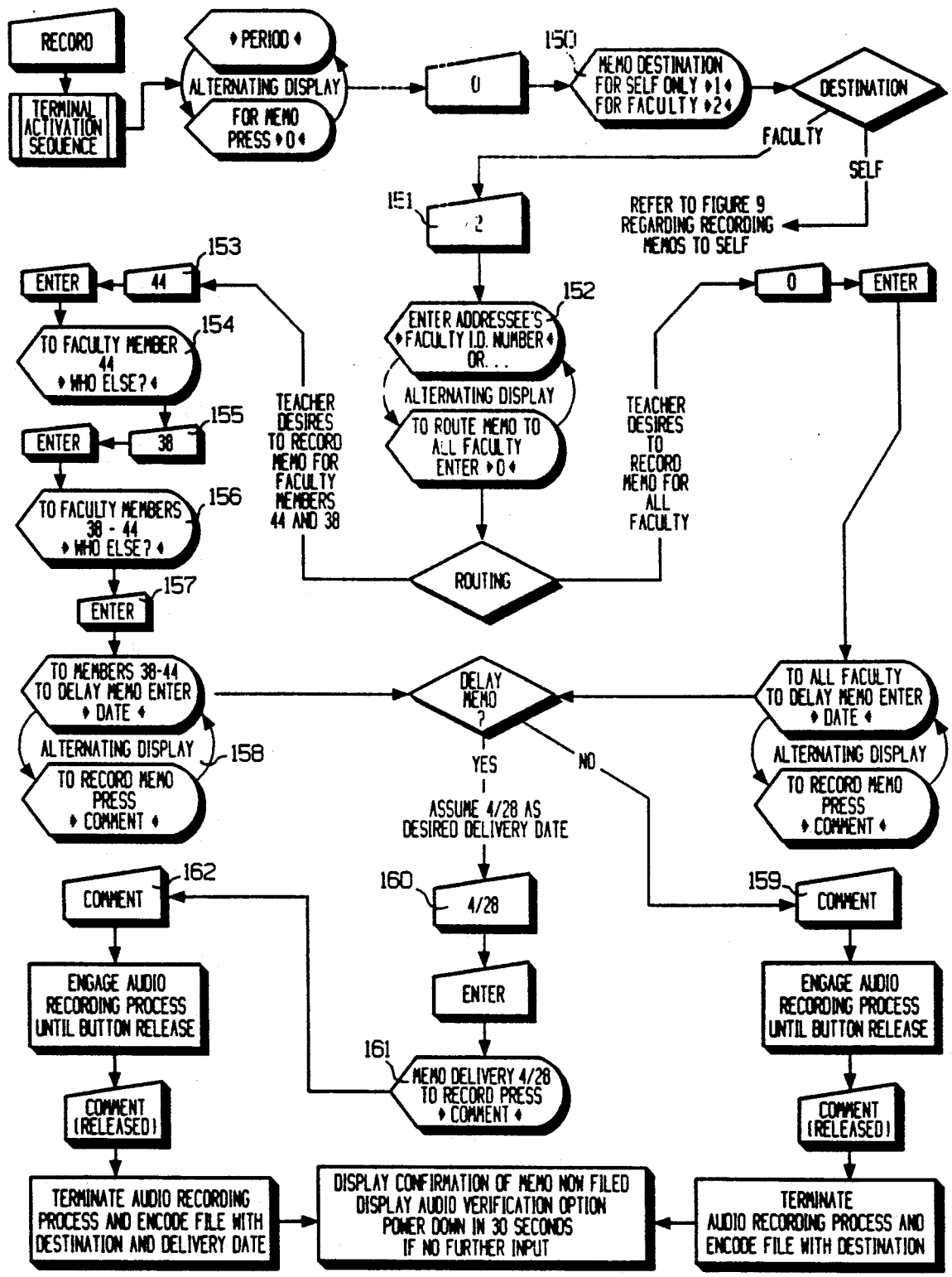
FIG. 10 is a flow chart illustrating a sequence of actions and operations involved in the use of a remote terminal for the purpose of recording outbound memoranda intended for playback on other remote terminals.

The alternate destination option of the memorandum function can be illustrated by assuming that the teacher chooses to direct a memorandum to certain faculty colleagues, such memorandum to be delivered on April 28th. Being prompted 150 (FIG. 10) to select the memorandum destination, the teacher presses 151 the "2" key, resulting in the appearance of visual prompt 152 not only verifying that the memorandum is intended for faculty, but also instructing the teacher to designate whether the memorandum is to be directed to specific faculty members or to all faculty.

Intending the memorandum to be directed only to faculty members 44 and 38, the teacher then enters 153 the faculty member number 44, causing the appearance of visual prompt 154 verifying that number as having been entered, as well as requesting the designation of any additional faculty. The teacher then indicates the other faculty member by entering 155 the other colleague's number as 38. When further requested 156 to submit another faculty member number, the teacher responds by simply pressing the "ENTER" key to indicate that no additional faculty are to be addressed 157. At such point further visual prompt 158 appears, confirming faculty members 38 and 44 as the intended recipients of the memorandum, and requesting a date of delivery. Should the teacher desire delivery to occur on the next school day, he would simply press 159 the "COMMENT" button to begin recording, omitting any date entry. However, as the teacher intends a delivery date of April 28th, he enters that date 160, such entry causing visual prompt 161 verifying the date as entered and instructing the teacher to press 162 the "COMMENT" button for the purpose of voicing and recording the memorandum as per established procedure.

D. TERMINAL STORAGE RACK DESCRIPTION

At the end of the school day each teacher places his or her remote terminal into any available receptacle found in centrally located storage rack 2 (FIG. 1) which serves the overnight function of remote terminal storage. The rack is of sufficient physical dimensions as to be conveniently mounted on wall or table and to accommodate the insertion of an appropriate number of remote terminals corresponding to the size of the school faculty. In addition to its function of physically storing the terminals, the rack also serves to electronically connect the stored terminals to central computer 3. Such connection is accomplished by way of multi-conductor cable 3a originating at the computer and connected to I/O device 2a incorporated within the terminal storage rack. The I/O device is a common solid state multiple contact switcher for routing computer I/O data to and from any selected remote terminal storage rack receptacle 2b. Each receptacle contains an electrical pin connector designed to mate with its counterpart located at the base of any given remote terminal. Mounted prominently on the front of each receptacle is LED 2c which, when activated by the computer, serves to indicate that the receptacle's remote terminal has been uploaded with one or more audio messages requiring prompt playback. Each of the multiplicity of such LEDs serves as a message status visual indicator. The cable, I/O device, and multiplicity of receptacles serve in combination the function of transferring data between the multiplicity of stored remote terminals and the central computer and are of sufficient capacity to effect the transfer of both data and address signals as well as enable pulses between the computer and terminals. Each terminal receptacle in the storage rack is wired in a such a way as to be part of a simple X/Y scan matrix, allowing the computer to utilize standard matrix scanning technique to detect the presence of each terminal for subsequent identification, regardless of location in the rack.

E. CENTRAL COMPUTER DESCRIPTION

Figure 11:
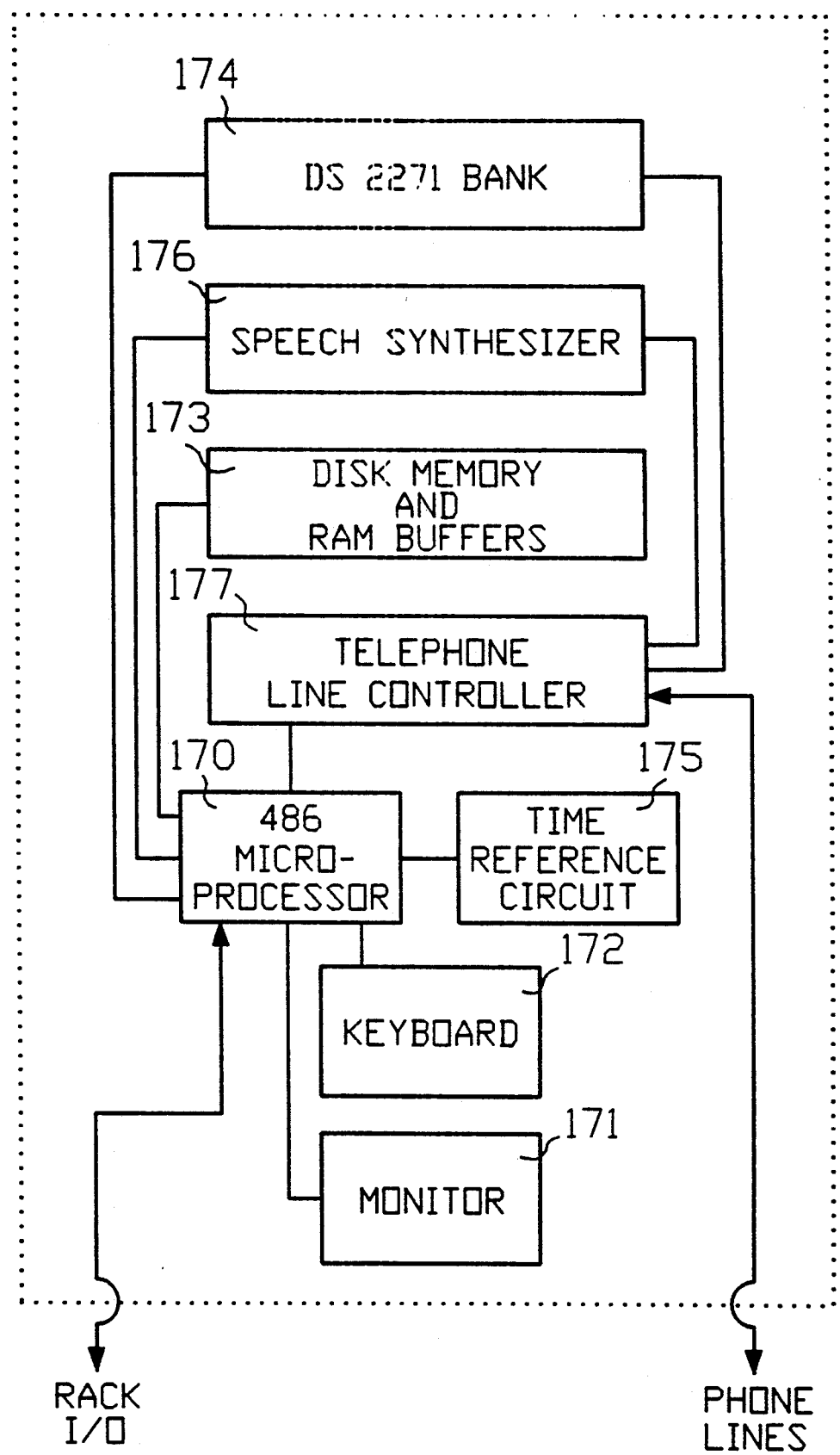
FIG. 11 is a block diagram showing the relationships among major components of a system's central computer.

In reference to FIG. 11 the present invention employs a personal computer based on Intel Corporation's 486 microprocessor 170 found to be in common use and serving in the present application as a computer controller. It should be noted, however, that other computers of comparable or superior performance may also be utilized in this application. The computer is connected to video monitor 171, which serves as a computer visual display. It also has keyboard 172, which permits computer manual data entry. The computer furthermore utilizes high capacity hard disk memory and associated RAM buffers 173 fulfilling the function of computer data storage. Additional associated circuitry includes DS2271 bank 174, comprising a plurality of DS2271's, as earlier discussed in the remote terminal description, each serving as a computer audio recorder/reproducer. Also included is time reference integrated circuit 175 serving as a computer time-keeper. Further incorporated are Texas Instruments-compatible speech synthesizer 176 serving the function of speech synthesis, and telephone line controller 177 serving as a telephone interface and containing an automatic telephone dialing device.

F. CENTRAL COMPUTER OPERATION

At the beginning of a school year an administrative staff member enters into the central computer the following database information:

1. The names of all teachers, each name also being phonetically spelled for the purpose of computer speech synthesis, accompanied by the unique terminal identification number of his or her remote terminal; a listing of numeric codes representing all classes taught by each teacher, including the period number of each such class; a phonetically spelled version of each such course title.

2. The names of all students, each student's name accompanied by its phonetic spelling and the unique student identification number associated with it; the numeric access code unique to that student's parents in addition to a telephone number by which the parents can be contacted; a listing of numeric codes representing all classes the student is scheduled to attend.

3. Phonetically spelled greetings, announcements and procedural instructions intended for outbound telephonic transmission to participating parents or guardians.

Figure 13:
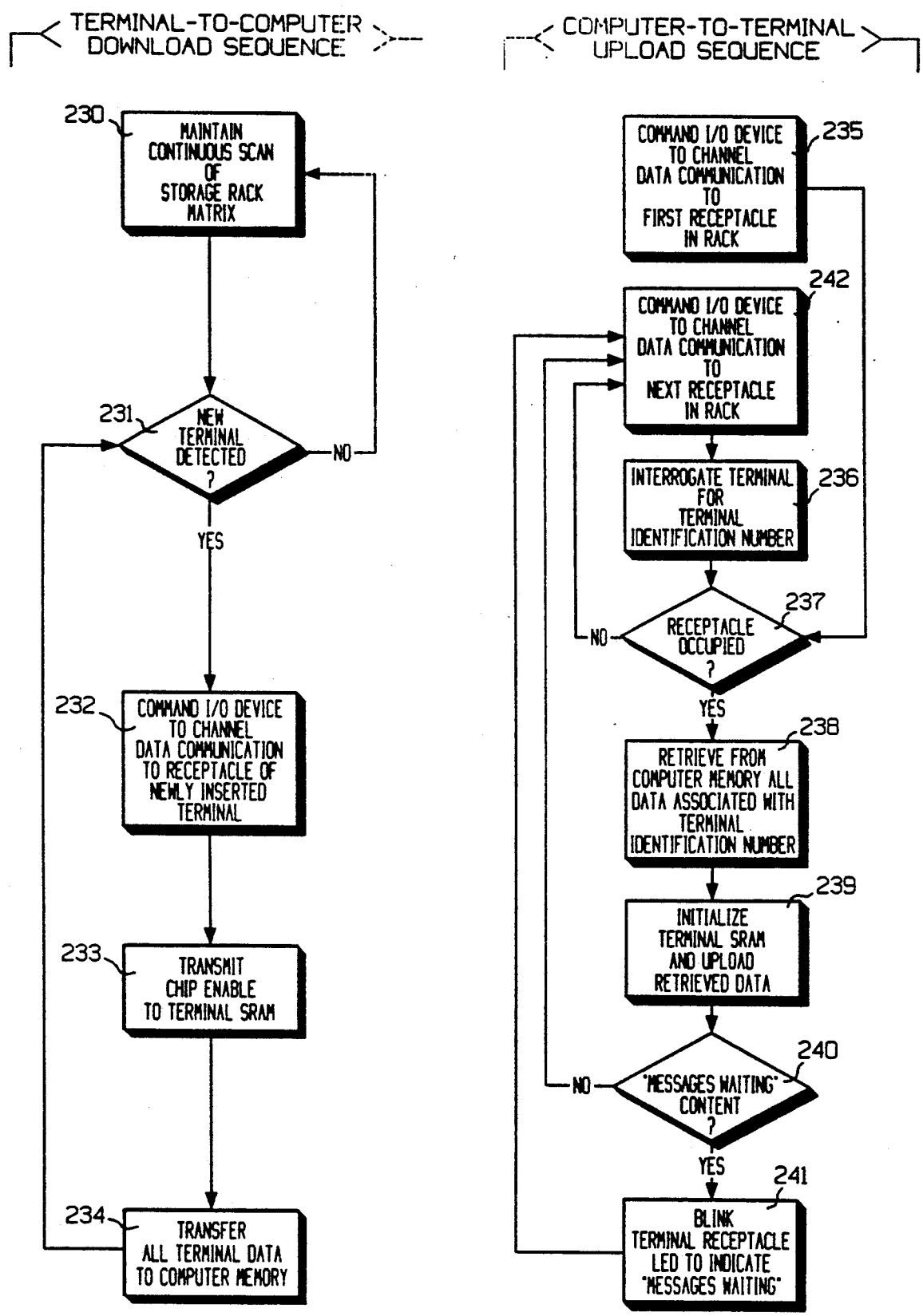
FIG. 13 is a flow chart illustrating a sequence of actions and operations involved in the uploading and downloading of data to and from a remote terminal.

Understanding that the above information is thus stored in the central computer memory, it will be best to resume discussion at the point at which a teacher has just placed his or her remote terminal into the terminal storage rack at the end of the school day:

As seen in the flow chart of FIG. 13, the central computer continuously scans 230 the terminal storage rack matrix to detect the presence and location of each remote terminal when placed in any receptacle in the rack. Locating 231 a newly inserted terminal, the computer instructs the rack I/O device to direct 232 all data communication to the receptacle in which that terminal now resides. Having established such connection, the computer then transmits 233 a chip enable pulse to that terminal's SRAM and downloads 234 all data contained therein to the computer memory.

It is important to note that each and every data string generated by a given remote terminal is encoded with the identification number unique to that terminal. The tagging of such discrete data strings insures the accuracy of subsequent operations performed upon them by the central computer, such as retrieval, re-storage and distribution.

Having stored all remote terminal data for the day, the computer is now able to correlate it with the database information earlier entered and to thereby perform its intended function of providing a highly effective communication bridge linking teacher and parent.

The operation of the central computer as it relates to teacher and parent can best be illustrated by an example involving the aforementioned student, Tim Jones: Tim's father arrives home from work and is greeted by his son who, quickly turning off the television, announces, "Dad! I need the car to go to the mall."

"Wait a minute, don't you have homework tonight?"

"No, not tonight."

"Oh?" replies the father in disbelief, not having seen Tim do homework for several nights, "Give me a few minutes and we'll talk about it." At this point the father goes to the telephone and calls the school's newly installed communication system, which in fact is the present invention and which for purposes of this illustration will be referred to as "Teacher's PET" (Teacher's Parent Enquiry Terminal).

Figure 12:
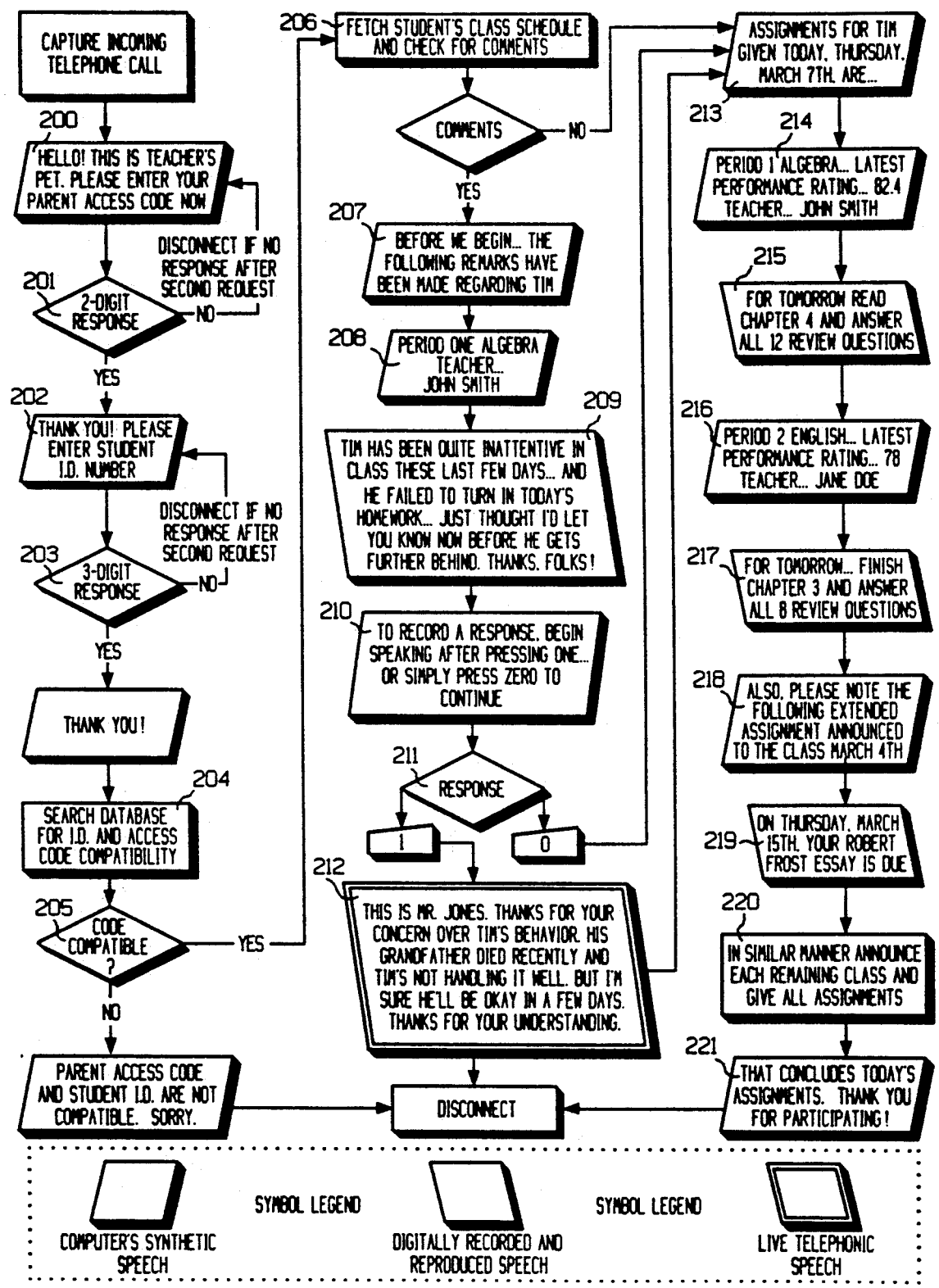
FIG. 12 is a flow chart illustrating the interaction that takes place between a system's central computer and a participating parent.

Upon receipt of the incoming call, the computer issues a greeting by way of internal speech synthesizer 176 (FIG. 11) as exemplified in beginning entry 200 of the Computer/Parent interaction flow chart, FIG. 12. Such greeting is of a generic nature and, as indicated, is followed immediately by a request to the caller to enter by way of telephone keypad his or her parent access code. In this illustration the caller is in fact a parent (Mr. Jones) with a valid prearranged access code. Mr. Jones then presses the appropriate keypad buttons.

Upon receipt of two-digit tone response 201, the computer issues an acknowledgement and further instructs 202 the caller to enter the student identification number associated with the student in question. Mr. Jones then presses the keypad buttons 1, 2, and 3 signifying the student identification number assigned to his son, Tim.

Receiving three-digit tone response 203, the computer issues an acknowledgement while searching 204 its database for student number/parent code compatibility. Such compatibility being ascertained 205, the computer then fetches 206 the class schedule, any existing absence reports or teacher comments, and all other pertinent information relating to Tim Jones. Having located in this case absences reported for both Periods 5 and 6 as well as one comment on file, the computer utilizes its speech synthesizer to state 207 the student's first name, in this case Tim, to announce the two absences, and to inform the parent that a teacher-recorded comment will be played before proceeding further. The computer then states 208 the origin of the comment by announcing the period number, the course title and the name of the commenting teacher. After such introduction the computer then plays 209 the actual audio recording of the teacher's comment concerning Tim's inattentiveness in Period 1 Algebra.

Upon playback completion the computer offers 210 the parent the opportunity of voicing a reply to the preceding comment, instructing the parent to accept or decline the opportunity by way of tone-digit response. Tim's father, wishing to reply to the teacher's comment, presses 211 the appropriate button on the telephone keypad and voices his reply 212, which the computer records, stores and relays to the commenting teacher's remote terminal for later playback.

Having reported the absences, played the teacher's comment and recorded the parental reply, the computer then restates the student's first name, Tim, along with the current day and date, as it announces that the day's homework assignments are to follow 213. At this point the computer continues to use its speech synthesizer to announce the period number, course title, Tim's most recent course performance rating, and the name of the teacher whose voice will next be heard 214. Such introduction now given, the computer proceeds to play 215 the actual recording of the teacher's voice as he originally announced the assignment to the class.

As no extended assignment exists for Period 1 Algebra, the computer now proceeds to announce 216 Tim's next period number, course title, most recent performance rating, and the course teacher's name. Immediately following the synthesized announcement of the teacher's name, Jane Doe, the computer plays 217 her actual voiced assignment as heard by her class. Since in this case an extended assignment has also been filed for the same Period 2 class, the computer announces 218 that fact and gives the date on which the extended assignment was first given to the class by the teacher. Such announcement completed, the computer then plays 219 the audio recording of the extended assignment as it was recorded by the teacher in front of the class.

In similar manner the computer continues to present 220 information to the parent regarding the student's remaining classes. After all such information has been presented, the computer completes the exchange and gives thanks to the parent for participating 221.

In the event in which an absence report or a teacher comment regarding a student remains unaccessed by the student's parent for a predetermined period of time, as measured by computer time reference 175 (FIG. 11), the computer upon parental pre-arrangement initiates by way of telephone line controller 177 an outbound telephone call to that parent. Upon the answering of the call the computer requests the answering party to enter the appropriate parent access code, such procedure being necessary to confirm that the message will indeed reach its intended recipient. Upon receipt of a valid tone-digit response, the computer then announces any recorded absences and also plays the audio recordings of any teacher's voiced comments on file concerning the particular student.

It should also be noted that through the present invention all telephonic communications both inbound and outbound, as well as any unauthorized or incomplete attempts, are computer-logged. Each such entry logged includes a summary of the following:

Date of call; time call was placed or received; duration of call; parent access code received; student identification number received; content of information exchanged such as assignments, teacher comments, parent replies, student performance ratings, and absence reports.

Up to this point it can be seen how the central computer extracts assignments, comments and other student-related information from each teacher's remote terminal placed in the storage rack, compiles such information, then telephonically provides the information to participating parents. Since it has been established that the computer receives and records parent replies to teacher comments, the procedure for distributing such replies to the intended teachers, as well as for the distribution of inter-teacher memos, can now be introduced:

In the early morning, shortly before the arrival of school staff, the computer begins its remote terminal upload sequence, as seen in the flow chart of FIG. 13. To begin the sequence the computer commands 235 the remote terminal storage rack's I/O device to direct data communication to the first receptacle in the rack. The computer then issues a chip enable pulse to that receptacle to interrogate 236 for terminal identification. In the event the computer does not receive a response to its interrogation, as in the case of an empty receptacle, it immediately commands 242 the I/O device to direct data communication to the next receptacle in the rack. Upon receipt 237 of a terminal identification number from an occupied receptacle, the computer retrieves 238 from its own memory all data associated with that unique terminal identification number, initializes the terminal's SRAM, then uploads 239 the retrieved data into that terminal's SRAM. In the event that such uploaded data contains any audio content 240 originating from sources other than that particular terminal, itself, the computer will cause 241 the "Message Waiting" LED for that terminal's receptacle to blink. In similar manner the computer proceeds to locate, identify and upload all remaining terminals in the rack. Thus loaded with the data assembled specifically for it, each terminal is now ready for the oncoming day's use.

Figure 14:
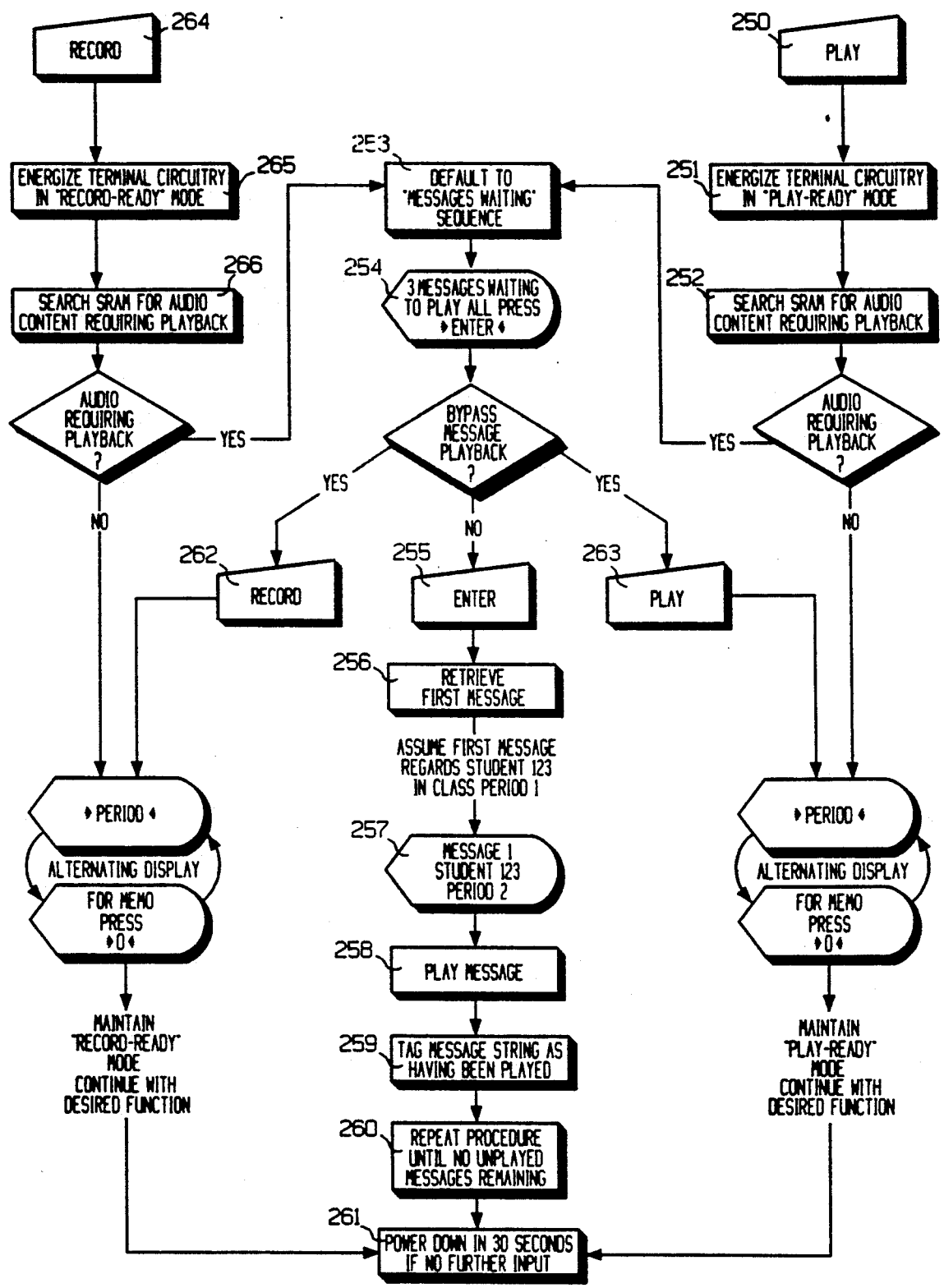
FIG. 14 is a flow chart illustrating a sequence of operations that occur during the activation of a remote terminal's circuitry.

To complete this description of the present invention the focus must now return to the operation of the remote terminal as it is first removed from the rack by the teacher to which it is assigned. With reference to FIG. 14 it will be assumed for illustration that John Smith, who teaches Period 1 Algebra, has just arrived at school and is about to remove his remote terminal from the storage rack. As he reaches for his terminal he immediately notices the flashing of his "Message Waiting" LED, located prominently on the front of the terminal receptacle. He removes the terminal and, while proceeding to his classroom, presses 250 the "PLAY" button, activating 251 the terminal in the "play-ready" mode. Upon such activation the terminal controller searches 252 SRAM for the presence of any audio content requiring playback and, locating such, initializes 253 a default "Messages Waiting" sequence. The controller then indicates via visual display that "MESSAGES" are "WAITING" 254 and prompts the teacher to press the "ENTER" key to play the messages. In response to the prompt, John Smith presses 255 the "ENTER" key, causing the controller to retrieve 256 the first message to be played, display text indicating both the class period number and student identification number to which the message pertains 257, and to play the complete message 258, tagging the message string immediately thereafter as having been played 259.

Upon completion of the audio playback of Mr. Jones' response (see 212, FIG. 12) to the comment made about his son, the teacher has now become aware of the reason behind the student's unusual behavior in Period 1 Algebra, and will be better able to handle the situation. After playing all remaining messages, the teacher simply pockets the remote terminal, as he proceeds with the day's activities.

It is appropriate to note at this point that whenever a remote terminal is either activated 264 by the "RECORD" button or activated 250 by the "PLAY" button, one of the first tasks performed by the terminal controller is that of searching 252/266 SRAM for the presence of any unplayed audio content of the following three categories:

1. Parent-to-teacher comment responses
2. Self and faculty memoranda
3. Student-related comments from other teachers Upon detecting the presence of such audio content, the controller prevents the "record-ready" mode from being activated, defaulting at such point to the "Messages Waiting" sequence 253. As seen in the flow chart blocks that immediately follow from this point, the "Messages Waiting" sequence serves as a temporarily enforced departure from the terminal function originally desired by the teacher. Such departure is for the purpose of insuring the prompt playing of important messages that might otherwise be postponed or neglected. Having initiated the "Messages Waiting" sequence, the controller immediately displays text 254 indicating the presence of messages requiring playback and prompting the teacher to review such messages by pressing the "ENTER" key.

If at such juncture the teacher does in fact comply by pressing the "ENTER" key, the controller fetches 256 the first unplayed message, displays text indicating the specific student and class period to which the message pertains 257, and plays the message 258. Such retrieval and playback sequence is repeated until there are no messages remaining that have not been played 260.

In the event the teacher wishes to bypass the "Messages Waiting" playback process for the purpose of either making a recording or playing back some other information, he or she has only to press 262 the "RECORD" button, or 263 the "PLAY" BUTTON, once again and follow established procedure. However, upon any subsequent activation of the terminal the controller will again default to the "Messages Waiting" sequence 253, until there are no unplayed messages remaining 260.

What we claim is:

1. An electronic communication method for telephonically relaying from teacher to parent information regarding student homework assignments, comprising in combination:

a plurality of remotely disposed audio-numeric terminals, henceforth referred to as remote terminals, each being self-powered and sufficiently compact in size as to be conveniently portable by way of pocket or purse, and each being assigned to a designated teacher and periodically interfaced with a dedicated central computer by way of a terminal storing means, centrally located, for physically storing said plurality of remote terminals and for electronically connecting the terminals to said central computer, each of the terminals being electronically encoded with a unique terminal identification number, and each of the terminals having:

a terminal audio recording and reproducing means for electronically recording and reproducing by way of digital representation voiced announcements made by the teacher regarding student homework assignments, said terminal audio recording and reproducing means functionally connected to and operated by a terminal controlling means for issuing electronic commands to the audio recording and reproducing means, and for receiving, identifying, routing and retrieving various digital data strings provided by the audio recording and reproducing means, said terminal controlling means being responsive to a terminal manual data entering means for enabling the teacher to enter an appropriate class period number that corresponds with a particular homework assignment to be voiced, and to a mode selecting means for switching terminal operating power on and for selecting either audio recording mode or audio reproducing mode of said terminal audio recording and reproducing means, said operating power derived from a self-contained power source for providing electrical power sufficient for all electrical operating power requirements of said terminal, said controlling means also being operatively connected to a terminal visual display, for presenting visible alphanumeric verification of input-output data and functional status, as well as for presenting procedural instructions to the teacher, and to a terminal data storing means of sufficient capacity and design to receive, maintain and furnish for retrieval all data directed thereto, as well as to maintain resident data disposed therein representing teacher procedural instructions to be supplied to said terminal visual display via said terminal controlling means, the controlling means also being responsive to a daily assignment selecting means, for activating and terminating function of said terminal audio recording and reproducing means in the recording mode or reproducing mode designated by said mode selecting means, whereby the teacher, having taken said remote terminal from said terminal storing means at the beginning of a school day, and now intending to announce a homework assignment to the students in a given class, can remove the terminal from pocket or purse and engage the mode selecting means to select the recording mode of the audio recording and reproducing means, such engagement causing the mode selection means to also direct operating power to the audio recording and reproducing means as well as to the visual display such that the controlling means can then retrieve from said terminal data storing means the data required to operate the visual display, thereby causing text to appear via the visual display in the form of a procedural prompt, in this case instructing the teacher to designate the specific class period for which the assignment is to be announced, so that the teacher is then required to enter via the manual data entering means a single digit response corresponding to the appropriate class period, such response then causing the controlling means to command the visual display to present text that prompts the teacher to engage said daily assignment selecting means and to begin voicing the intended homework assignment, upon which engagement such voicing is electronically recorded by the audio recording and reproducing means, while the controlling means causes the visual display to indicate that a voiced homework assignment is being recorded for the class period designated until the daily assignment selecting means is disengaged, causing termination of such recording process, and furthermore causing the controlling means to append an identifying code to the resulting data string which has through such procedure been produced by the audio recording and reproducing means and which therefore represents such voicing and which the controlling means then routes to the data storing means for maintenance and subsequent retrieval, such retrieval being immediately executed in the event that the teacher then selects via the mode selecting means the audio reproducing mode of the audio recording and reproducing means, thereby causing the controlling means to default to the most recently made recording and to retrieve such recently stored data and direct such data to the audio recording and reproducing means, thereby causing an audible reproduction of the voiced homework assignment to be presented for review by the teacher, the controlling means having also caused the visual display to present textual verification of the class period associated with the voiced homework assignment currently being played, after which review, and after any remaining voiced homework assignments have been recorded for subsequent class periods, the terminal is then placed by the teacher into the centrally located terminal storing means, the storing means having a data transferring means, for transferring data between said plurality of remote terminals and said central computer, the computer having:

a computer controlling means for receiving, identifying, time dating, routing and retrieving various digital data strings provided by a plurality of sources including said data transferring means, said computer controlling means operatively connected to a computer time-keeping means, for providing a continuous time reference standard, and to a computer data storing means of sufficient capacity and design to receive, maintain and furnish for retrieval all data directed thereto, the computer controlling means additionally being responsive to a computer manual data entering means, for enabling a school administrative staff member operator to enter data representing school class schedules, teacher names, each name corresponding to said unique terminal identification number associated with a given terminal, student names with associated student identification numbers, and parent access codes, the computer controlling means also being operatively connected to a computer visual display, for presenting visual verification of input and output data and operational status as well as for presenting procedural instructions to the staff member operator, the computer controlling means also operatively connected to a telephone interfacing means, for receiving incoming telephone calls arriving separately or simultaneously via a plurality of discrete paths, for translating tone digit signals thereby received into electronic commands, for directing such resulting commands to the computer controlling means, and for transmitting outgoing analog signals representative of voiced announcements, the computer controlling means also being operatively connected to a computer audio recording and reproducing means, including a plurality of submodules, each of said submodules being capable of performing similar yet discrete audio recording and reproduction tasks, for receiving commands from the computer controlling means, for extracting from said computer data storing means data strings specified by such commands, for converting such data strings into analog signals representative of voiced announcements, and for directing such signals to said telephone interfacing means for outbound transmission, the computer controlling means also being operatively connected to a speech synthesizing means, for converting alphanumeric data into audio representations of human speech utterances of such data, whereby at the end of a given school day each teacher in compliance with established school procedure can return his or her terminal to the terminal storing means, enabling the computer controlling means via the data transferring means to extract from the terminal data storing means all data received therein as a result of the day's operation, and whereby at the beginning of a given school term, or at any other chosen time, the staff member operator can employ said computer manual data entering means to enter the full names of all students registered with the school, each student's full name accompanied by additional data including a phonetically spelled version of the student's first name;

a unique student identification number;

a unique numeric access code assigned to the student's parents;

a listing of numeric codes representing all classes the student is scheduled to attend, the staff member operator also being able to enter the names of all teachers employed by the school, each such name also expressed in a phonetically spelled version and accompanied by the unique terminal identification number associated with that teacher's assigned terminal, and accompanied as well by a listing of numeric codes representing all classes taught by each named teacher, the staff member operator also being able to enter a listing of numeric codes representing each and every class being taught throughout the school, each such code being accompanied by a phonetically spelled version of its corresponding course title, the staff member operator also being able to enter phonetically spelled greetings, announcements and procedural instructions intended for outbound telephonic transmission to parents who utilize said electronic communication system, such manual data entries made by the staff member operator being received by the computer controlling means which then directs such data to the computer data storing means, whereby a parent of a student can establish a telephonic connection to the communication system by using a tone digit dialing telephone and a designated telephone number arranged to establish contact with said telephone interfacing means, causing the computer controlling means to retrieve from the computer data storing means data representing a phonetically spelled greeting and to direct such data to said speech synthesizing means, causing transmission of a resulting synthesized voicing of such greeting that instructs the parent to enter by telephone a tone digit response representing said numeric parent access code, such response resulting in the computer controlling means then causing by similar procedure a synthetically voiced instruction to be transmitted, advising the parent to enter a subsequent tone digit response representing his or her student's student identification number, such response causing the computer controlling means to retrieve from the computer data storing means data relevant to the individual student associated with the student identification number, the computer controlling means then executing a comparison of the student identification number to the numeric parent access code earlier received, such comparison yielding either compatibility or noncompatibility between both numeric codes, and such comparison procedure being for the purpose of deterring unauthorized telephonic acquisition of a given student's class schedule and other student related information, such compatibility, however and therefore, being established, the computer controlling means then retrieves from the data storing means and directs to the speech synthesizing means data strings representing appropriate announcements and procedural instructions, the computer controlling means also issuing appropriate commands to said audio recording and reproducing means, with the result that the parent is telephonically presented with a synthesized voice indicating the student's first name and announcing that a summary of the individual student's homework assignments for the most recent school day, such day and date being cited, is to follow, at which point the synthesized voice continues by announcing the first class period number on the student's schedule, followed by the course title and teacher's name, upon which announcement follows an audio recording of the indicated teacher's voice announcing a homework assignment, such recording having been made via the teacher's remote terminal earlier in the most recent school day during the teacher's actual live announcement to the class, such that, after the audio recording has been presented, the synthesized voice continues by announcing the second class period number, course title and teacher's name, upon which announcement follows an audio recording of that subsequently indicated teacher's voice announcing an additional assignment, such procedure being executed fully to the point at which all such homework assignments for the individual student have been presented, at which point the parent then terminates the telephonic connection.

2. The method of claim 1, further including an extended assignment selecting means, for designating an extended assignment operation, as well as for activating and terminating function of said terminal audio recording and reproducing means in the recording or reproducing mode designated by said mode selecting means, said extended assignment selecting means being operatively connected to said terminal controlling means, whereby said teacher, intending to announce to a given class an extended homework assignment, such extended assignment differing from a daily assignment by having a due date extending beyond the next school day, can remove said terminal from pocket or purse and use established procedure to select the recording mode of said terminal audio recording and reproducing means, causing said terminal controlling means to retrieve from said terminal data storing means data required to command said terminal visual display to present a textual prompt instructing the teacher to designate the specific class period for which the extended assignment is to be announced, such designation, submitted via said terminal manual data entering means, resulting in a subsequent visual prompt instructing the teacher to choose the desired terminal operation by engaging either said daily assignment selecting means or the extended assignment selecting means, such that in the event in which the teacher engages the extended assignment selecting means a visual prompt will thereby instruct the teacher to indicate the calendar date by which such extended assignment is to be accomplished, such that the teacher can then indicate such date via said manual data entering means, resulting in the display of another visual prompt instructing the teacher to once again engage the extended assignment selecting means and to voice the intended assignment with its designated due date, upon which secondary engagement such voicing is electronically recorded by said terminal audio recording and reproducing means, while text is presented via said terminal visual display to confirm that an extended assignment for the specified due date is being recorded for the class period designated until the teacher disengages the extended assignment selecting means, resulting in termination of the recording process, and thereby causing said terminal controlling means to append a code signifying the due date as indicated by the teacher, as well as an identifying code, to the resulting data string which has been produced by said terminal audio recording and reproducing means and which therefore represents the voicing and which said terminal controlling means then directs to said terminal data storing means for maintenance and subsequent retrieval, such retrieval being possible immediately for playback review, if needed, such that after any further voiced assignments have been recorded for subsequent class periods, the terminal is then placed in said centrally located terminal storing means, whereby said central computer will respond to telephonic interrogation by a parent so as to present not said daily assignments, but also any extended assignment pending, such extended assignment being presented on every occasion of parent interrogation of said communication system, until the actual arrival of the due date designated for such extended assignment, at which time such presentation will cease.

3. The method of claim 2, further including a telephone interfacing means, for placing outbound telephone calls under command of said computer controlling means, and a comment selecting means, operatively connected to said terminal controlling means, for designating a comment operation as well as for activating and terminating function of said terminal audio recording and reproducing means in the recording or reproducing mode designated by said mode selecting means, and a plurality of message status visual indicators, each being prominently located on the face of said terminal storing means and in a position corresponding to the location at which each said remote terminal is periodically inserted, for providing visual indication of completed message data transfer, said plurality of message status visual indicators responding to and activated by said central computer, whereby said teacher, wishing to voice a comment regarding the behavior of a particular student and wanting such comment to be made rapidly available for presentation to that student's parent or, instead, to one or more faculty colleagues, can activate said remote terminal by established procedure, indicate the relevant class period via said terminal manual data entering means, then engage said comment selecting means with the result that said terminal controlling means then causes a visual prompt to appear via said terminal visual display, instructing the teacher to indicate via said terminal manual data entering means a student identification number uniquely associated with the particular student, such response then causing said terminal controlling means to issue in similar manner a subsequent visual prompt presenting to the teacher the option of indicating via said terminal manual data entering means that the comment to be recorded is to be routed exclusively to one or more faculty colleagues, rather than to the particular student's parent, the visual prompt also informing the teacher that such faculty routing option can be declined and circumvented by engaging once again the comment selecting means and voicing the intended comment, upon which secondary engagement such voicing is electronically recorded by said terminal audio recording and reproducing means while text is presented via said terminal visual display to confirm that a comment is being recorded for the class period designated and that such comment pertains to the student represented by said student identification number until the teacher disengages the comment selecting means, resulting in termination of the recording process, and thereby causing said terminal controlling means to append an identifying code including said student identification number to the resulting data string which has been produced by said terminal audio recording and reproducing means and which therefore represents the voicing and which said terminal controlling means then directs to said terminal data storing means for maintenance and subsequent retrieval, such retrieval being possible immediately for playback review, if needed, such that after all further use in subsequent classes the terminal can be placed in said centrally located terminal storing means, whereby said central computer will respond to telephonic interrogation by the particular student's parent by presenting an announcement to the effect that there is a teacher's comment recorded regarding the particular student, and then by immediately presenting the audio recording of such comment made by the teacher, all teacher comments understood as taking precedence over other information presented via said communication system, and whereby said central computer, upon previous arrangement and clearance with the parent, can via said computer controlling means command said telephone interfacing means to originate a telephone call to the parent, to inform the parent that a teacher's comment is to follow, to instruct the parent to enter said numeric parent access code via tone digit response, to compare and verify such response, and then to present the audio recording of said comment, the computer being further able to receive and record voiced statements or questions offered by the parent in response to a particular comment, and additionally able to route such audio recordings to the appropriate teacher's remote terminal, and furthermore able to log such telephonic exchange as an accomplished event for future reference.

4. The method of claim 3 further including a performance rating selecting means, operatively connected to said terminal controlling means, for designating a performance rating operation, whereby said teacher, intending to make available for presentation via said communication system the most recent student performance ratings in a given class, performance ratings being equivalent to cumulative averages of student academic scores in percentage terms, can activate said remote terminal by established procedure, then engage said performance rating selecting means, thereby causing said terminal controlling means to issue by way of said terminal visual display a visual prompt instructing the teacher to provide via said terminal manual data entering means said student identification number corresponding to a particular student, such designation causing said terminal controlling means to extract from said terminal data storing means such student-related data necessary to then produce an additional visual display indication of any previously indicated performance rating expressed numerically in percentage terms for such student, in addition to a procedural prompt instructing the teacher to indicate the current updated performance rating via said manual data entering means, such updating causing by similar procedure the appearance of subsequent visual prompts alternately instructing the teacher to indicate in similar manner all remaining student identification numbers and the updates of performance ratings associated with such identification numbers, such that upon completion of all such further updates the teacher can at the end of the school day return said remote terminal to said terminal storing means, whereby a student's parent, having established telephonic contact and interaction with said communication system by way of established procedure, will be apprised of his or her student's most recent performance rating for each class to present such performance rating information, said central computer in manner similar to that previously established retrieves from said computer data storing means the appropriate performance rating data associated with the particular student at issue and causes said speech synthesizing means to articulate such numeric data.

5. The method of claim 4, further including an absence report selecting means, operatively connected to said terminal controlling means, for designating an absence reporting operation, whereby said teacher, intending to report the absence of one or more students from a given class, can activate said remote terminal by established procedure, then engage said absent report selecting means, causing said terminal controlling means to issue by way of said terminal visual display means a visual prompt instructing the teacher to indicate said student identification number associated with a particular student to be reported absent, such indication being made via said terminal manual data entering means and causing said terminal controlling means to direct such data to said terminal data storing means as well as to cause subsequent visual prompts to appear, instructing the teacher to indicate additional student absences in similar manner, until all such absences have been noted by such procedure, such that at the end of the school day the teacher can then replace said remote terminal in said centrally located terminal storing means, whereby a parent, upon establishing telephonic contact with said communication system, will be informed by way of audible announcement, preceding the announcements normally presented regarding a given class, of the reported absence of the particular student from such class as well as the date on which the absence occurred, such announcement resulting from the action of said computer controlling means in extracting the absence report data from said computer data storing means and issuing the appropriate commands to said speech synthesizing means, and whereby said computer, upon previous arrangement and clearance with the parent, can via said computer controlling means command said telephone interfacing means to originate an outbound telephone call to the parent, to inform the parent that a student absence report is to follow, to instruct the parent to enter said numeric parent access code via tone digit response, to compare and verify such response, to then present by established procedure such audible announcement informing the parent of the student's absence from the given class and the date of such reported absence.

6. The method of claim 5, further including a memorandum selecting means, operatively connected to said terminal controlling means, for designating a memorandum operation, whereby a teacher, intending to record a memorandum, can activate said remote terminal by way of established procedure and engage said memorandum selecting means, thereby causing said terminal controlling means to issue by way of said terminal visual display a visual prompt instructing the teacher to indicate the intended destination for the memorandum to be recorded, such that the teacher can then designate a numeric code by way of said terminal manual data entering means, such code designating whether the memorandum is intended strictly for personal use by said teacher, or for presentation to one or more faculty colleagues, such that in the case in which the teacher indicates that the memorandum is for personal use said terminal controlling means will cause a visual prompt to appear, instructing the teacher to then indicate the calendar date upon which the memorandum is to be presented, if in fact the teacher does desire the memorandum to be presented at a future date beyond the next school day, such date being indicated via said manual data entering means and causing in similar manner the appearance of an additional prompt instructing the teacher to engage said comment selecting means and to begin voicing the intended memorandum whereupon, during engagement of said comment selecting means, an audio recording of the voicing is made via said terminal audio recording and reproducing means, the data representative of which is directed to said terminal data storing means for subsequent retrieval, and such that in the case in which the teacher indicates that the memorandum is intended for one or more faculty colleagues said terminal controlling means will cause in similar manner a visual prompt to appear, instructing the teacher to designate one or more numeric codes identifying the intended recipients, then further instructing the teacher to indicate a delivery date for the memorandum, if in fact the teacher desires it to be delivered on a future date extending beyond the next school day, so that after such indications have been made a further visual prompt will appear in similar manner, directing the teacher to engage said comment selecting means and to voice the memorandum, during which process data representative of the resulting audio recording is directed to said terminal data storing means for subsequent retrieval, such that at the end of the school day the teacher can replace said remote terminal in said centrally located terminal storing means, whereby said central computer by established procedure and under the direction of said computer controlling means can then extract such memorandum data from said terminal data storing means via said data transferring means and direct such data to said computer data storing means, whereupon said computer controlling means can then route and distribute by way of said data transferring means each separately addressed string of memorandum data that is encoded for the following day's delivery to said terminal data storing means of each appropriate remote terminal, such that at the beginning of a school day, when a teacher first activates his or her remote terminal, said terminal controlling means immediately searches for the presence of any memoradum data string contained within said terminal data storing means and, upon locating such a string, or multiplicity of such strings, issues a play mode command to said terminal audio recording and reproducing means, overriding, if necessary, any record mode command previously in effect, and conjointly causes said visual display means to present text informing the teacher of the presence of such memorandum, or memoranda, requiring prompt review, such that the teacher can then initiate a play command via said mode selecting means, causing the terminal controlling means to direct all appropriate memorandum data strings to the terminal audio recording and reproducing means, resulting in the audio reproduction of such memoranda, and further causing the terminal controlling means to append a code to each memorandum data string to indicate that it has actually been reviewed by the teacher, and such that in the case in which the teacher, upon being alerted to the presence of a memorandum, elects to postpone reviewing such memorandum, said terminal controlling means will again cause a visible alert each time said remote terminal is activated on various occasions throughout the day until such memorandum is finally reviewed by the teacher.

* * * * *